United States Patent
Yamaguchi et al.

(10) Patent No.: US 6,963,032 B2
(45) Date of Patent: Nov. 8, 2005

(54) HIGH ACCURACY FOAMED COAXIAL CABLE AND METHOD FOR MANUFACTURING THE SAME

(75) Inventors: Tetsuo Yamaguchi, Sowa-machi (JP); Mitsuo Iwasaki, Sowa-machi (JP); Takao Ishido, Sowa-machi (JP); Takaaki Kusama, Sowa-machi (JP); Mitsuo Nanjyo, Sowa-machi (JP); Shigeru Matsumura, Tokyo (JP); Shigeru Murayama, Tokyo (JP)

(73) Assignees: Hirakawa Hewtech Corporation, Tokyo (JP); Advantest Corporation, Tokyo (JP)

( * ) Notice: Subject to any disclaimer, the term of this patent is extended or adjusted under 35 U.S.C. 154(b) by 7 days.

(21) Appl. No.: 10/503,914

(22) PCT Filed: Feb. 10, 2003

(86) PCT No.: PCT/JP03/01358

§ 371 (c)(1),
(2), (4) Date: Oct. 25, 2004

(87) PCT Pub. No.: WO03/067611

PCT Pub. Date: Aug. 14, 2003

(65) Prior Publication Data

US 2005/0115738 A1   Jun. 2, 2005

(30) Foreign Application Priority Data

Feb. 8, 2002 (JP) .............................. 2002-033044
Apr. 17, 2002 (JP) .............................. 2002-114451

(51) Int. Cl.$^7$ .............................................. H01B 7/00
(52) U.S. Cl. ............................. 174/102 R; 174/110 F
(58) Field of Search .......................... 174/102 R, 108, 174/110 F, 36; 333/243

(56) References Cited

U.S. PATENT DOCUMENTS

| 4,092,488 A | * | 5/1978 | Hayami et al. ........... 174/84 R |
| 5,457,287 A | * | 10/1995 | Shimozawa et al. ..... 174/102 R |
| 6,337,443 B1 | * | 1/2002 | Dlugas et al. .......... 174/120 R |

FOREIGN PATENT DOCUMENTS

| JP | 57-9010 | * | 1/1982 |
| JP | 7-37450 |  | 2/1995 |
| JP | 7-249326 |  | 9/1995 |
| JP | 8-69717 |  | 3/1996 |
| JP | 2002-50246 |  | 2/2002 |
| JP | 2003-51220 |  | 2/2003 |

* cited by examiner

Primary Examiner—Chau N. Nguyen
(74) Attorney, Agent, or Firm—McGinn & Gibb, PLLC

(57) ABSTRACT

A foamed coaxial cable with high precision according to the present invention comprises: an internal conductor twisted with a plurality of electrically conductive wires; a foamed insulator with its low dielectric constant made of a porous tape body formed on the outer periphery of this internal conductor; an external conductor made of a number of electrically conductive thin wires braided on the outer periphery of this foamed insulator; and an outer sheath made of a resin having heat resistance formed on the outer periphery of this external insulator, wherein the precision of external diameter of the internal conductor is 4/1000 mm or less, the precision of external diameter size of the foamed insulator is ±0.02 mm, the insulator is formed in a completely circular shape, the precision of external diameter size of the external conductor is ±2%, the external conductor is formed in a completely circular shape, and the precision of characteristic impedance value between the internal conductor and the external conductor having the foamed insulator interposed therebetween is ±1 Ω.

22 Claims, 17 Drawing Sheets

ONE-OVER AND ONE-UNDER

TWO-OVER AND TWO-UNDER

HIGH ACCURACY FOAMED COAXIAL CABLE AND METHOD FOR MANUFACTURING THE SAME

BACKGROUND OF THE INVENTION

Field of the Invention

The present invention relates to a foamed coaxial cable with high precision in which an insulator on the outer periphery of an internal conductor is formed by a porous tapering body, and an external conductor is formed by a braided shielding body. For example, the present invention relates to a foamed coaxial cable with high precision applied to information communication equipment and a testing/inspecting instrument of a semiconductor device applied to such equipment, the foamed coaxial cable having less change in characteristic impedance value.

In addition, the present invention relates to a fabricating method of a foamed coaxial cable with high precision in which an insulator on the outer periphery of an internal conductor is formed by a porous tape body, and an external conductor is composed of an braid body with electrically conductive thin wires. More particularly, the present invention relates to a fabricating method of a foamed coaxial cable with high precision in which the thickness of an insulator and an external conductor and a change in external diameter are reduced in order to obtain a foaming rate of 60% and a characteristic impedance value of ±1 Ω, and these elements are formed in a completely circular manner.

RELATED ART

Prior Art

In recent years, with advancement of highly information-oriented society, there has been a growing demand to speed up a transmission velocity and to improve transmission precision of information communication equipment and testing/inspecting instrument and the like of a semiconductor device applied to such equipment. Thus, in a coaxial cable and a coaxial cord applied to such equipment and devices or the like as well, it is required to speed up a transmission velocity and to improve transmission precision.

Here, typical electrical characteristics required for coaxial cables are described as follows.

Propagation delay time $(Td) = \sqrt{\epsilon}/0.3$ (nS/m)

Relative transmission velocity $(V) = 100/\sqrt{\epsilon}$ (%)

Characteristic impedance $(Zo) = 60/\sqrt{\epsilon} \cdot LnD/d$ (Ω)

Electrostatic capacity $(C) = 55.63\epsilon/Lnd/d$ (PF/m)

where $\epsilon$ is an insulator specific dielectric constant, D is an external diameter of the insulator (internal diameter of an external conductor), and "d" is an external diameter of a conductor (external diameter of an internal conductor).

From the foregoing, the insulator specific dielectric constant and the external diameter of the internal conductor and insulator are associated with coaxial cable transmission characteristics. With respect to the specific dielectric constant, it can be understood that, as its value is smaller, the transmission characteristics are improved more significantly. With respect to the external diameter of the internal conductor and insulator, it can be understood that the insulator specific dielectric constant is small and its dispersion is small. In addition, it can be understood to be ideal that there is less dispersion in external diameter of the internal conductor and insulator (internal diameter of a shield layer) or the like and these shapes are formed in a more completely circular cylinder shape.

However, in a conventional coaxial cable, there have been problems described in the following <1> to <4>.

<1> An internal conductor applied to the coaxial cable is formed of a silver plated soft copper wires of AWG 20 to 30 or is formed of a twisted conductor obtained by twisting these wires. An external diameter tolerance of the silver plated soft copper wires is ±3/1000 mm. In the twisted conductor, for example, if these seven wires are twisted, a tolerance of the external diameter of these twisted wires is obtained as ±3×3/1000 mm. Thus, if cabling is provided within a tolerance of ± in external diameter of these wires, it causes a large change in the characteristic impedance and electrostatic capacity or the like described previously. This effect is greater as the internal conductor is thinner.

<2> In a formed insulator applied to the coaxial cable, at present, its porosity (forming rate) is 60% or more, and more pores are provided in order to minimize a cable propagation delay time and to speed up a transmission velocity. In this manner, the insulator specific dielectric constant ($\epsilon$) is 1.4% or less, thereby reduce a transmission time and an attenuation quantity or the like. An insulator material whose porosity is 60% or more and whose specific dielectric constant is 1.4 or less is applied such that a porous tape body made of polytetrafluoro ethylene (PTFE) (described in Japanese Patent Application Publication No. 42-13560 and Japanese Patent Application Publication No. 51-18991) is wound on the outer periphery of the internal conductor, and sintering processing is applied during or after such winding. The other porous tape body is provided by applying a polyethylene tape body of 5,000,000 or more average molecular weights in percentage by weight (Japanese Patent Application No. 2000-110643).

However, these insulator layers are large in thickness or dispersion of porosity because of the properties of the porous tape body. In stability of the coaxial cable transmission characteristics, its improvement is strongly demanded. In particular, in a coaxial cable having a small-diameter conductor of AWG 24 or more in internal conductor size and an impedance value of 50 Ω, such improvement has been a great obstacle in promoting stabilization by eliminating a dispersion in transmission characteristics according to a dispersion in thickness, external diameter, porosity, and sintering or the like.

In addition, the insulator layer is constructed by winding a porous tape body to be layered on the outer periphery of an internal conductor. Thus, external irregularities due to layer with a cavity portion occurs with a layered portion of the tape body on the outer periphery of the conductor, and the dispersion in specific dielectric constant and external diameter becomes very large.

In addition, this insulator layer is constructed by winding a porous tape body with its very small mechanical strength. Thus, there is a need to minimize the tensile stress of the tape body in order to eliminate expansion or wire breakage when the tape body itself is wound and in order to eliminate expansion or wire breakage of a very thin internal conductor. Therefore, in the insulator after wound, as the dispersion in external irregularities and external diameter further increase, intimacy with the internal conductor is very weak, and the dispersion in specific dielectric constant and external diameter further increases.

Further, in this insulator layer, its specific dielectric constant is reduced in order to minimize a cable propagation delay time and to speed up a transmission velocity. Thus, there has been a disadvantage that structural dimensions of coaxial cables are hardly maintained due to mechanical strength. i.e., a mechanical stress such as bending, twisting, compression, or vibration and the like subjected to the coaxial cables. The most important disadvantage is that the dispersion is hardly eliminated by maintaining the external diameter of the insulator to a predetermined external diameter, and further, the shape of the insulator is hardly formed in a cylindrical shape.

<3> In the conventional coaxial cable of such type, an external conductor greatly associated with coaxial cable transmission characteristics has been applied to be constructed by winding or longitudinally applying a plastic tape body having a metal layer such as copper on one face on the outer periphery of an insulator. In addition, this external conductor has been applied to be composed of a braid body braided with a silver plated soft copper wire or tin plated soft copper wire of ±3/1000 mm in external diameter tolerance in accordance with JIS Standards. Further, the external conductor has been applied to be combined with the above tape body and the above braid body.

However, if the above tape body is wound or longitudinally applied, the cable flexibility becomes insufficient, and the external conductor is easily broken due to a mechanical stress such as bending or twisting applied to the cable. As a result, the external conductor malfunctions. In the braid body with silver plated soft copper wires, silver smoothness is small, and thus, frictional force due to contact among the silver plated soft copper wire increases. Thus, the movement of elemental wires configuring the braid body is eliminated due to a mechanical stress such as bending or twisting applied to the cables. Then, the cable flexibility lacks, the insulation layer is deformed, and the characteristic impedance value changes. In addition, there is a problem that the effect caused by the a mechanical stress cannot be reduced, and the service life of the cable is reduced.

In case where a braid body with tin plated soft copper wires is used at a high temperature (80° C. or more), copper diffuses in a tinplating layer, and the generation and growth of tin whiskers is promoted due to a diffusion stress. When these whiskers grow greatly, there has been a case in which a very thin insulator is broken, and the internal conductor is shorted. Further, as described in item <2> which explains the insulator, the above described external conductors each are formed on the outer periphery of the insulator having external irregularities of the insulator and dispersion in external diameter. Thus, the external and internal portions of the external conductor are irregular, and are large in external diameter diffusion. In addition, many more cavity portions are provided between the external conductor and insulator layer, and the factors of a change in specific dielectric constant still remains unsolved.

<4> Conventionally, an outer sheath provided on the outer periphery of the external conductor is constructed to be formed of a vinyl chloride resin, a polyethylene resin, or a fluoro resin, alternatively, by cross linking them. Functionally, priority has been given to physically protecting a coaxial core, eliminating movement of the external conductor, and minimizing the finish external diameter. Thus, there has been a construction such that an outer sheath resin is charged into a gap of the braid body. Therefore, when a mechanical stress such as bending, twisting, or vibration and the like is applied to a coaxial cable, it has been impossible to permit movement for the coaxial core to reduce the stress in the outer sheath (movement of elemental wires of the braid body).

SUMMARY OF THE INVENTION

Accordingly, it is an object of the present invention to provide a foamed coaxial cable with high precision capable of speeding up a transmission velocity, capable of improving precision in characteristic impedance value, improving cable flexibility, capable of, even if a mechanical stress such as bending, twisting, compression, or vibration and the like is applied to the cable, maintaining a predetermined mechanical strength by reducing such stress, and capable of reducing a change in characteristic impedance value.

It is a further object of the present invention to provide a fabricating method of a foamed coaxial cable with high precision capable of: secondarily molding a highly foamed insulator and an external conductor of the coaxial cable having a highly foamed insulator (foaming rate of 60% or more) to which a porous tape body has been applied and an external conductor; making uniform the thickness and external diameter thereof and forming them in a completely circular shape, thereby improving precision of characteristic impedance value between the internal and external conductors; and capable of stabilizing a secondary molding step.

According to a feature of the invention, a foamed coaxial cable with high precision comprises:
an internal conductor having a plurality of electrically conductive wires twisted with each other;
a foamed insulator with a low dielectric constant made of a porous tape body formed on an outer periphery of the internal conductor;
an external conductor made of a number of electrically conductive thin wires braided on an outer periphery of the foamed insulator; and
an outer sheath made of resin having heat resistance formed on an outer periphery of the external conductor, wherein the precision of external diameter of the internal conductor is 4/1000 mm or less; the precision of external diameter size of the foamed insulator is ±0.02 mm, the precision of external diameter size of the external conductor is ±2% of the external diameter center value, the shape of which is formed in a completely circular shape; and the precision of the characteristic impedance value between the internal conductor and the external conductor having the foamed insulator interposed therebetween is ±1 Ω.

With this construction, the precision of external diameter size is improved by reducing a dispersion in irregularities and external diameter of the internal conductor, insulator, and external conductor or the like configuring a foamed coaxial cable with high precision, each member can be formed in a completely circular shape, and change in characteristic impedance value can be reduced.

In addition, the internal conductor may be formed by twisting silver plated soft copper wires to which silver plating of 2/1000 mm or less in precision of external diameter size and 1 to 3 μm in thickness has been applied.

With this construction, a change in irregularities and external diameter of the internal conductor, for reducing a change in characteristic impedance value, can be reduced.

In addition, the foamed insulator may be formed by winding the porous tape body on the outer periphery of the internal conductor in ½ overlay turn, a change in thickness of the foamed insulator after wound is ±0.01 mm, and a change in outer diameter is ±0.02 mm.

With this construction, intimacy between the internal conductor and the insulator is increased by eliminating a gap generated by tape winding between the internal conductor and the insulator, and the external diameter of the insulator is made close to a completely circular shape, whereby a dispersion in external diameter can be reduced.

In addition, the foamed insulator may be formed by winding the porous tape body on the outer periphery of the internal conductor so that the porous tape body itself does not overlay, the width of the porous tape body to be wound is three times of the external diameter size of the foamed insulator, and the precision of the width thereof is ±1%.

In addition, the foamed insulator may have at least the two or more porous tape bodies, each of which does not overlay on the outer periphery of the internal conductor with a tape widthwise interval in the same direction.

With these constructions, there is eliminated the layer of the tape body as an insulator constructed by winding the tape body; there are eliminated the cavities between the conductor and the insulator caused by layer of tape body winding and the cavities and irregularities on the outer periphery of the insulator; the dispersion in external diameter is reduced; and the insulator specific dielectric constant is made uniform.

In addition, the foamed insulator may have an outer diameter holding layer constructed by winding a plastic tape body on the outer periphery thereof.

With this construction, the irregularities and change in external diameter of the insulator is suppressed, the external diameter of the insulator is made uniform, and the mechanical strength of the insulator can be increased.

In addition, the porous tape body may be a sintered PTFE tape body of 0.6% to 0.8% in distortion of compression deformation in case where the porosity thereof is 60% or more, the precision of the porosity is ±5%, a thickness tolerance is ±3 µm, and a compression stress is 0.24 to 0.28 Kg by weight.

In addition, the porous tape body may be a polyethylene tape body with 5,000,000 or more in average molecular weight by weight of which the porosity is 60% or more, the precision of porosity is ±5%, and the thickness tolerance is 3 µm.

With this construction, there are eliminated a dispersion in specific dielectric constant, thickness, and mechanical strength or the like, of the porous tape body configuring the foamed insulator, whereby a change in insulator specific dielectric constant and external diameter can be reduced, and a tensile stress of winding the tape body can be made uniform.

In addition, the external conductor may be made of a braid body of double-layered, plated soft copper wires in which a tin alloy plating of 0.2 to 0.5 µm in thickness is applied to a silver plated soft copper wire of 1 to 3 µm in thickness, thereby obtaining an external diameter tolerance of ±2/1000 mm.

In addition, the external conductor may be formed of a braid body of double-layered, plated soft copper wires in which a tin alloy plating of 0.2 to 0.5 µm in thickness is applied to a nickel plated soft copper wire of 1 to 3 µm in thickness, thereby obtaining an external diameter tolerance of ±2/1000 mm.

With these constructions, the elemental wires of shots each configuring a braid body can be individually moved when a mechanical stress is applied to a cable. In addition, the smoothness of the braid body is improved, and flexibility is improved. Further, the smoothness and flexibility are improved, thus making it possible to mold a braid body. A change in irregularities and external diameter of the braid body is reduced, thereby improving intimacy with an insulator.

In addition, the tin alloy plating consists essentially of tin and copper, and the copper percentage content may be 0.6% to 2.5%.

With this construction, copper diffusion is prevented, the generation and growth of whiskers are suppressed, a braid body maintaining dielectric constant is provided, and the smoothness of braid body elemental wire is improved.

In addition, wherein a braid body configuring the external conductor may be braided when the number of braiding shots each configuring the braid is "one-over" and "one-under".

With this construction, the shots each configuring the braid body are braided by "one over" or "one under". Thus, the force of maintaining the shape of the braid body itself increases, the holding force of holding the insulator increases. Then, intimacy with the insulator is improved.

In addition, the outer sheath may have the thickness of 0.5 times or more of that of the external conductor, the thickness precision of 3/100 mm or less, and the force of making intimate contact with the external conductor of 20 g/mm$^2$ at 23° C., and may be formed by extrusion molding of an FEP resin.

With this construction, the external conductor is maintained in an externally cylindrical shape, whereby its release can be suppressed, and the precision of characteristic impedance value can be improved.

According to the second feature of the invention, a method for fabricating a foamed coaxial cable with high precision having: an internal conductor; a foamed insulator formed on the outer periphery of the internal conductor; and an external conductor formed on an outer periphery of the foamed insulator, the method comprising:

a take-up step of winding a porous tape body of 60% or more in porosity around the internal conductor supplied from a supply portion, thereby forming the foamed insulator;

an insulator molding step of inserting the foamed insulator formed in the take-up step into a molding die having a predetermined internal diameter, thereby molding the insulator in a predetermined external diameter and in a completely circular shape;

a braiding step of braiding a plurality of electrically conductive thin wires on the outer periphery of the foamed insulator formed in the insulator molding step, thereby forming the external conductor; and an external conductor molding step of inserting the external conductor formed in the braiding step into an external conductor die having a predetermined internal diameter, thereby forming the external conductor in a predetermined external diameter and in a completely circular shape.

With this construction, the thickness and external diameter of a foamed insulator configured by winding a porous tape body on the outer periphery of an internal conductor and an external conductor or the like composed of a braid body on the outer periphery of the foamed insulator are made uniform, thereby forming them in a completely circular shape. In this manner, the intimacy between the internal conductor and foamed insulator and between the foamed insulator and external conductor can be improved.

In addition, the insulator molding step comprises: a primary molding step of inserting the insulator into a primary molding die having a predetermined internal diameter, thereby molding the insulator; and a secondary molding step of inserting the insulator into a second molding die having a predetermined internal diameter, thereby molding the insulator.

With this construction, when the foamed insulator is molded by a molding die, stable molding can be carried out without damaging, expanding, and wire breakage a foamed insulation wire core.

In addition, a method for fabricating a foamed coaxial cable may further comprise an external diameter holding layer step of forming a very thin external diameter holding layer by winding the layer on the outer periphery of the foamed insulator molded in a predetermined external diameter and in a completely circular shape in accordance with the insulator molding step.

With this construction, the external diameter and external diameter of the foamed insulator molded in a predetermined external diameter and in a completely circular shape can be continuously maintained.

In addition, the external conductor molding step comprises: a primary molding step of inserting the external conductor into a primary molding die having a predetermined internal diameter, thereby molding the conductor; and a secondary molding step of inserting the external conductor into a secondary molding die having a predetermined internal diameter, thereby molding the conductor.

With this conduction, the external conductor is brought into intimate contact with the foamed insulator, the thickness and external diameter thereof is made uniform, and operation is stabilized by eliminating the wire breakage, deformation, expansion, and damage or the like in the external conductor molding step of forming the external diameter in a completely circular shape, whereby productivity can be improved.

In addition, the external conductor molding step molds the external conductor by rotating the external conductor molding die in predetermined frequency of rotation.

With this construction, external conductor molding is stabilized in the external conductor molding step, and wire breakage, deformation, expansion, and damage or the like can be eliminated.

In addition, the external conductor molding step applies ultrasonic vibration to the external conductor molding die, and applies a predetermined vibration in an external diameter direction of the external conductor, thereby molding the external conductor.

With this conduction, external conductor molding is stabilized in the external conductor molding step, and wire breakage, deformation, expansion, and damage or the like can be eliminated.

In addition, the external conductor molding step may be provided after the braiding step, may be provided immediately alone before the outer sheath forming step of the outer sheath formed on the outer periphery of the external conductor, or may be provided as both of a step after the braiding step and a step immediately before the outer sheath forming step.

With this construction, the molding precision of molding the external conductor can be improved more significantly.

In addition, in the external conductor molding step, in case where a frictional force between the external conductor inserted into the primary molding die and the primary molding die may be equal to or larger than a predetermined value, the secondary molding die is rotated in predetermined frequency of rotation.

With this construction, molding of the external conductor is carried out in a more stable manner in the external conductor molding step, and further, the molding precision can be improved.

In addition, when a frictional force between the external conductor inserted into the primary molding die and the primary molding die may be equal to or larger than a predetermined value, ultrasonic vibration is applied to the secondary molding die.

With this construction, molding of the external conductor is carried out in a more stable manner in the external conductor molding step, and further, the molding precision can be improved.

BRIEF DESCRIPTION OF THE SEVERAL VIEWS OF THE DRAWINGS

The invention will be described in more detail in conjunction with the appended drawings, wherein.

DESCRIPTION OF THE PREFERRED EMBODIMENT

Hereinafter, preferred embodiments of the present invention will be described with reference to the accompanying drawings.

Figure 1:
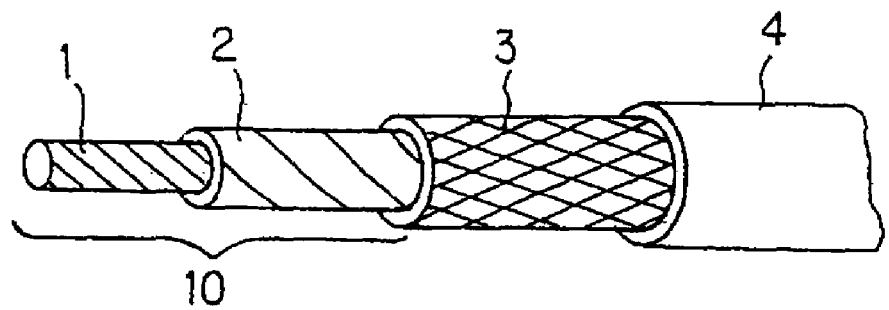
FIG. 1 is a perspective view showing a construction of a foamed coaxial cable with high precision according to one embodiment of the present invention.

FIG. 1 is a perspective view showing a construction of a foamed coaxial cable with high precision according to one embodiment of the present embodiment.

Figure 2A:
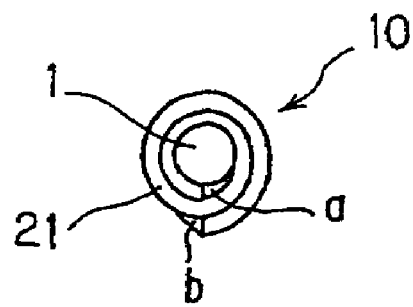
FIGS. 2A and 2B are views each showing a construction in which a porous tape body in the foamed coaxial cable with high precision according to the foregoing embodiment is wound on the outer periphery of an internal conductor.
Figure 2B:
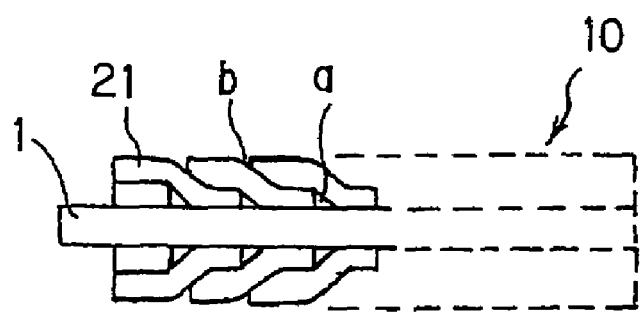

This foamed coaxial cable with high precision shown in FIG. 1 is constructed by sheathing an insulator 2 that has a plurality of elemental wires, an external conductor 3 made of a braid body, and an outer sheath 4 in ascending order. As shown in FIGS. 2A and 2B, an insulation wire core 10 comprises the internal conductor 1 and the insulator 2 constructed by winding a porous tape body 21 around this internal conductor 1 by ½ turn.

This foamed coaxial cable with high precision is applied to, for example, information communication equipment and a testing/inspecting instrument or the like of a semiconductor device applied to the equipment. The characteristics required for a foamed coaxial cable with high precision applied to such equipment or apparatus include: high flexibility, less effect caused by a mechanical stress such as bending or vibration, stable transmission characteristics, in particular, stable characteristic impedance value, less change in characteristic value even if such a mechanical stress is applied, small external diameter, and high heat resistance or the like.

In addition, the conditions for improving the flexibility of a coaxial cable must be met as described in the following items <1> to <6>. <1> Elemental wires each configuring the internal conductor 1 must have flexibility. In addition, in case where these elemental wires are twisted, they must be movable. <2> The internal conductor 1 and insulator 2 must be individually movable without being brought into intimate contact with each other (without being integrated with each other). <3> The external conductor must be composed of a braid body. <4>. The insulator 2 and external conductor 3 must be individually movable without being brought into intimate contact with each other (without being integrated with each other)<5> Elemental wires of the external conductor 3 each must be individually movable.

<6> The external conductor 3 and outer sheath 4 must be individually movable without being brought into contact with each other (without being integrated with each other).

That is, in order to reduce an effect caused by a mechanical stress and improve flexibility, it is indispensable that members 1, 2, 3, and 4 configuring the coaxial cable each must be individually movable.

In addition, the conditions for improving the precision of characteristic impedance value of the coaxial cable must be met as described in the following items <1> to <4>. <1> The elemental wires configuring the internal conductor 1 each must be integrated with each other, must be formed in a completely circular shape, and must be small in external diameter change. <2> The insulator 2 must be constant in specific dielectric constant, must be formed in a completely circular shape, must be small in external diameter change, and must be in intimate contact (integrated) with the internal conductor 1. <3>. The external conductor 3 must be integrally formed in a completely circular shape, must be free of a change in external diameter and thickness, and must be in intimate contact (integrated) with one insulator. <4> The outer sheath 4 must be integrated in intimate contact with the external conductor 3, and must restrict movement of the external conductor 3 in the outer sheath 4.

Namely, in order to improve the precision of characteristic impedance value, it is indispensable that constituent elements each must be integrated in intimate contact with each other, must be finished in a completely circular shape, must be reduced in external diameter change, and must be made constant in specific dielectric constant. As is obvious from these matters, the conditions for making the coaxial cable flexible are in inverse relation to those for improving the precision of characteristic impedance value.

Therefore, the foamed coaxial cable with high precision according to the present embodiment is provided so as to meet the conditions described in following items <1> to <5>. <1> The internal conductor 1 must be composed of twisted wires, the elemental wires each must be movable; the twisted external diameter must be constant, the external diameter change must be small, and the internal conductor must be formed in a completely circular shape. <2> The insulator 2 must be made constant in porosity, thickness, and mechanical strength by applying a porous tape body in order to reduce a specific dielectric constant. <3> The insulator 2 must be compose of the porous tape body, must be integrated in intimate contact with the internal conductor 1, must be small in change of specific dielectric constant, thickness, and external diameter, and must be completely circular in external diameter. <4> The external conductor 3 must be composed of a braid body, must be large in shape maintenance capability, must be flexible, must be integrated in intimate contact with the insulator 2, must be small in change of external diameter and thickness, and must be completely circular in internal diameter. <5> The outer sheath 4 must have heat resistance and flexibility, must have smaller effect on the external conductor 3, insulator 2, and internal conductor 1 even if it is subjected to a thermal or mechanical stress, and must be small in finished external diameter.

From the foregoing, as shown in FIGS. 2A and 2B, the foamed coaxial cable with high precision according to the present embodiment is such that the internal conductor 1 (the conductor size is defined by way of example in which AWG #26 has been applied) is obtained as a conductor twisted by applying soft copper wires, each of which has a silver plating in 1 to 3 $\mu$m in thickness applied thereto, and each of which is 0.16 mm in external diameter and is 2/1000 mm or less in external diameter precision. In the present embodiment, seven twisted conductors are provided, the twisted "pt" is 20 times or less of the layered core diameter, and the precision of the layered core diameter is 4/1000 mm or less.

In order to ensure that the external diameter precision of the silver plated soft copper wire is 2/1000 mm or less, the internal diameter precision of the extension wire die must be 1/1000 mm or less and the management and withdrawal velocities of physical properties must be ±1% in tolerance. In addition, in order to ensure the twisted external diameter precision is 4/1000 mm or less, the winding tensile stress during twisting must be ±5% in tolerance.

A reason why the external diameter precision of the elemental wire of the silver plated soft copper wire and the precision of the twisted external diameter are restricted is that a dispersion in external diameter of the internal conductor 1 in the coaxial cable of small diameter is reduced, and that a change in characteristic impedance value is eliminated by forming the wire in a completely circular shape. This condition is indispensable in order to improve the precision of the wire.

When the external diameter precision of each element wire is 3/1000 mm or less, a dispersion in external diameter of seven twisted wires is obtained by formula 1. On the other hand, when the precision of external diameter of the twisted wires is 5/1000 mm, in case where the external diameter of the insulator 2 has been changed by 0.02 mm in accordance with a computing formula for the characteristic impedance value described in the Related Art, it is found that the characteristic impedance value of ±1 Ω cannot be met.

$$\sqrt{(3/1000)^2+(3/1000)^2+(3/1000)^2} > 5/1000 \text{ mm} \quad \text{[Formula 1]}$$

To the insulator 2, there is applied a sintered porous PTFE tape body of 60% or more in porosity, ±5% in precision, ±3 μm in thickness tolerance, and 0.6% to 0.8% in distortion of compression deformation when a compression stress of 0.24 to 0.28 Kg by weight is applied, alternatively, a polyethylene porous tape body or the like of 5,000,000 in average molecular weight by weight. The tape body of 4.6 mm in width and 0.09 mm in thickness is wound by ½ overlay while an angle of winding around the internal conductor is set to 80°. Further, a tape body of 6.9 mm in width and 0.9 mm in thickness is constructed by winding it at a winding angle of 80° and at ½ overlay.

The insulation wire core 10 constructed by winding the tape body is formed so that a change in external diameter is ±1.5% of the external diameter of the insulator in tolerance. The porosity is set to 60% or more, and the precision is maintained within the range of ±5% in order to speed up a propagation delay time (in order to meet a specific dielectric constant of 1.4 or less). In addition, the precision of the insulator specific dielectric constant affects that of the characteristic impedance value as well. The thickness tolerance is maintained within the range of ±3 μm, and the layer of tape winding is set to ½ in order to improve the thickness precision of the insulator 2.

In addition, the winding angle is set to 80° by using a sintered PTFE tape of 0.6% to 0.8% in distortion of compression deformation when a compression stress of 0.24 to 0.28 Kg by weight is applied in order to reduce breakage of the tape body during winding. A method for forming the insulator 2 of ±1% in external diameter change is carried by molding processing in which the insulation wire core 10 is inserted into a molding die for molding the external diameter of the insulator 2 in a predetermined diameter after the tape body has been wound or when a braid body layer is formed.

This molding processing eliminates the rounding of the internal conductor 1 generated by the porous tape body (tape winding body) shown in FIGS. 2A and 2B and cavities "a" and "b" at the outside of the insulator 2. In this manner, the intimate contact of the insulator 2 with the internal conductor is promoted, and the irregularities the inner and outer peripheries of the insulator 2 due to winding is eliminated. By this processing, the thickness of the insulator 2 is made uniform, a dispersion in external diameter is eliminated, and the external view of the insulator is formed in a completely circular, cylindrical shape.

This molding processing is made possible because, even if the porosity of the porous tape body 21 is set to 60% or more, the thickness of the body is restricted at the above mentioned numeric value. In the conventional coaxial cable in which the degree of foam is set to 70 or more in order to only speed up a transmission velocity, it has been impossible to carry out this molding processing because the mechanical strength of the porous tape body 21 is weak, a change in external diameter of the insulator 2 occurs, the irregularities are present.

The external conductor 3 is formed at the insulation wire core 10 formed to be ±1.5% in external diameter change, i.e., on the outer periphery of the insulator 2. To the external conductor 3, a soft copper wire having an external diameter of 0.05 mm to 0.10 mm is applied, and a silver or nickel plated layer of 1 to 3 μm in thickness is applied on the outer periphery thereof. Further, a tin alloy plated layer of 0.20 to 0.50 μm in thickness is applied, and a soft copper wire having a double-layered, plated layer of ±2/1000 mm in external diameter tolerance is applied. In this manner, the external conductor is braided at a braiding angle of 65 to 75° and a braiding density of 95% or more, and is formed to be ±1% in precision of the braided external diameter.

A reason why the braid body is applied to the external conductor 3 is that, when a mechanical stress such as bending, twisting, compression, and vibration or any other stress has been applied to the foamed coaxial cable with high precision, no damage occurs with the insulator 2 and external conductor 3 and the flexibility of the cable is maintained.

The soft copper wire having the double-layered plated layer made of the silver or nickel plated layer and tin alloy plated layer is applied to the braided elemental wire in order to reduce the frictional resistance on the surface of the elemental wire and improve smoothness. In this manner, when a mechanical stress is applied to the cable, the elemental wires each are easily moved, the stress is diffused, and an effect on the insulator 2 is eliminated. In addition, the shape of the braid body is maintained, thereby holding the insulator 2, preventing buckling of the braid body, and at the same time, preventing the release of the internal stress.

Reasons why the tin alloy plated layer is provided on the outer periphery of each elemental wire are that the above smoothness is improved, and that the occurrence of whiskers is prevented. The tin alloy is made of tin and copper, and the copper percentage content is 0.6% to 2.5%. In addition, generally called lead-free solder plating can be applied, the plating containing 0.3% to 3.5% silver and it to 10% bismuth. With respect to the plating construction of each elemental wire, it is effective to apply tin plating with high conductivity and small dynamic frictional coefficient. When tin is independently used at a high temperature, copper diffuses in the tin plated layer. In addition, the generation and growth of whiskers are promoted due to the diffusion stress. Thus, the shorting between the internal conductor 1 and the external conductor 3 due to the grown whiskers is prevented. In order to prevent whiskers, the following items <1> to <4> are effective. <1> The internal copper diffusion is prevented. <2> An additive is put into tin. <3> The internal stress due to heat treatment is decreased. <4> The plating thickness is reduced. When a silver or nickel plated layer is provided, the copper diffusion is prevented. However, the dynamic frictional coefficient is large, and thus, the movement between elemental wires is impaired, eliminating cable flexibility.

In order to improve the movement between elemental wires and ensure cable flexibility, a soft copper wire to which a tin alloy molten plated layer of 0.20 to 0.50 μm has been further applied on the above plated layer. In order to ensure that the thickness of a plated layer such as base silver or nickel is 1 to 3 μm, the thickness of 1 micros or more is required to prevent silver diffusion. If the thickness is excessive, it affects cable flexibility. When the thickness of the tin alloy plating is 0.2 μm or less, the base silver plating is exposed, lacking flexibility. In addition, when the thickness is 0.5 μm or more, whiskers are likely to occur. Now, an outline of the dynamic frictional coefficient of each metal will be described. The dynamic coefficients are 1.30 in silver, 0.90 in copper, and 0.55 in tin alloy. From these values, it can be understood to be effective to apply a tin alloy plating with a small dynamic frictional coefficient to an elemental wire of a braid body. The dynamic frictional coefficient of each metal is obtained by using a Bowden type low weighting frictional testing equipment.

The external diameter precision of the braid body is molded to be ±2%, whereby the braid body layer is squeezed in its lengthwise direction. Then, the cavities of the braid body itself are eliminated, and the braid body is brought into intimate contact with the insulator more significantly. Then, the cavities between the braid body and the insulator is eliminated, and the internal diameter of the braid body is made close to the completely circular, cylindrical shape. AS a result, the characteristic impedance value is made constant, a change of which is reduced. A method for forming the external diameter precision of the braid body layer to be ±2% is executed by molding processing in which a wire core with a braid body layer is inserted into a molding die for molding the external diameter braid body layer to be a predetermined external diameter after braiding or when a coaxial cable outer sheath 4 described later is molded.

This molding processing is possible because a porous tape body 21 has been restricted to the contents described previously, thus improving the mechanical strength of the insulator 2, a change in external diameter of the insulator 2 and irregularities are further eliminated, and a change in external diameter of the braid body and irregularities are eliminated. Further, the braid body is composed of soft copper wires each having a tin alloy plated layer, whereby the frictional resistance is reduced. Thus, insertion into the molding die is possible, and molding processing can be performed.

In the conventional coaxial cable of a tape winding insulator of 70 or more in degree of foaming, which merely speeds up a transmission velocity, it has been impossible to carry out this molding processing because the external diameter change of the braid body shield layer and the irregularities of the external diameter are large.

At the outer periphery of the braid body in which the external diameter precision is molded to be ±2% by the above described molding processing, the outer sheath 4 of which thickness is 0.5 times of that of the external conductor 3 and a force of making intimate contact with the braid body layer is 20 g/mm² or more at 23° C., is constructed by protrusion molding of an FEP resin. A reason for restricting the thickness is that, when a mechanical stress is applied to a cable, the shape of the braid body is maintained, preventing buckling. If the intimate contact force is less than 20 g/mm², it is impossible to suppress the release of the internal stress of the braid body. As a result, the stability of precision of the characteristic impedance value lacks. When the intimate contact force is 20 g/mm², the release of the internal stress can be suppressed.

Now, the winding of the porous tape body 21 and a method for molding the insulator 2 to be ±1.5% in external diameter change will be described with reference to FIG. 3.

A twisted conductor (internal conductor) 1 is supplied from a supply portion (not shown) to first, second, and third guide dies 30a, 30b, and 30c and molding dies 31a and 31b of a tape winding device. The supplied conductor 1 is rotated in the direction by the arrow Y1 in predetermined frequency of rotation. This rotating conductor 1 is passed through the first guide die 30a by being transferred in the direction by the arrow Y2 at a predetermined velocity. Then, in front of the second die 30b, the porous tape body 2l supplied from a tape body supply portion 15 is wound. The porous tape body 21 is wound on the outer periphery of the conductor 1 by ½ overlay by the rotation in the direction by the arrow Y1 of the conductor 1 itself when an angle of 80° and a tape tensile stress of 300 g are set relevant to the conductor 1. Further, the tape body is wound again on the outer periphery thereof.

In this manner, the tape winding body having passed through the second die 30b by winding the porous tape body 21 is inserted into the first and second molding dies 31a and 31b disposed between the second and third guide dies 30b and 30c. Here, molding is carried out at ±2% in external diameter change by the first molding dies 31a of 1.13 mm in internal diameter and 3.0 mm in internal diameter length. The porous tape body 21 having passed through the first die 31a is then inserted into the second molding die 31b. Here, molding is carried out at dimensions of 1.12 mm in internal diameter and 3.00 mm in internal diameter length and at a predetermined external diameter and its tolerance. By the above molding processing, the external diameter of the porous tape body 21 is formed in a completely circular, cylindrical shape, and the intimacy with the conductor 1 is improved. In addition, the thickness non-uniformity, the irregularities of external diameter, and dispersion in external diameter or the like are decreased. The porous tape body 21 is molded by the molding dies 31a and 31b more smoothly while the molding dies 31a and 31b or the like are rotated in predetermined frequency of rotation. Further, in case where tape winding and tape body sintering are carried out at the same time, the molding dies 31a and 31b may be heated at a sintering temperature.

Figure 4:
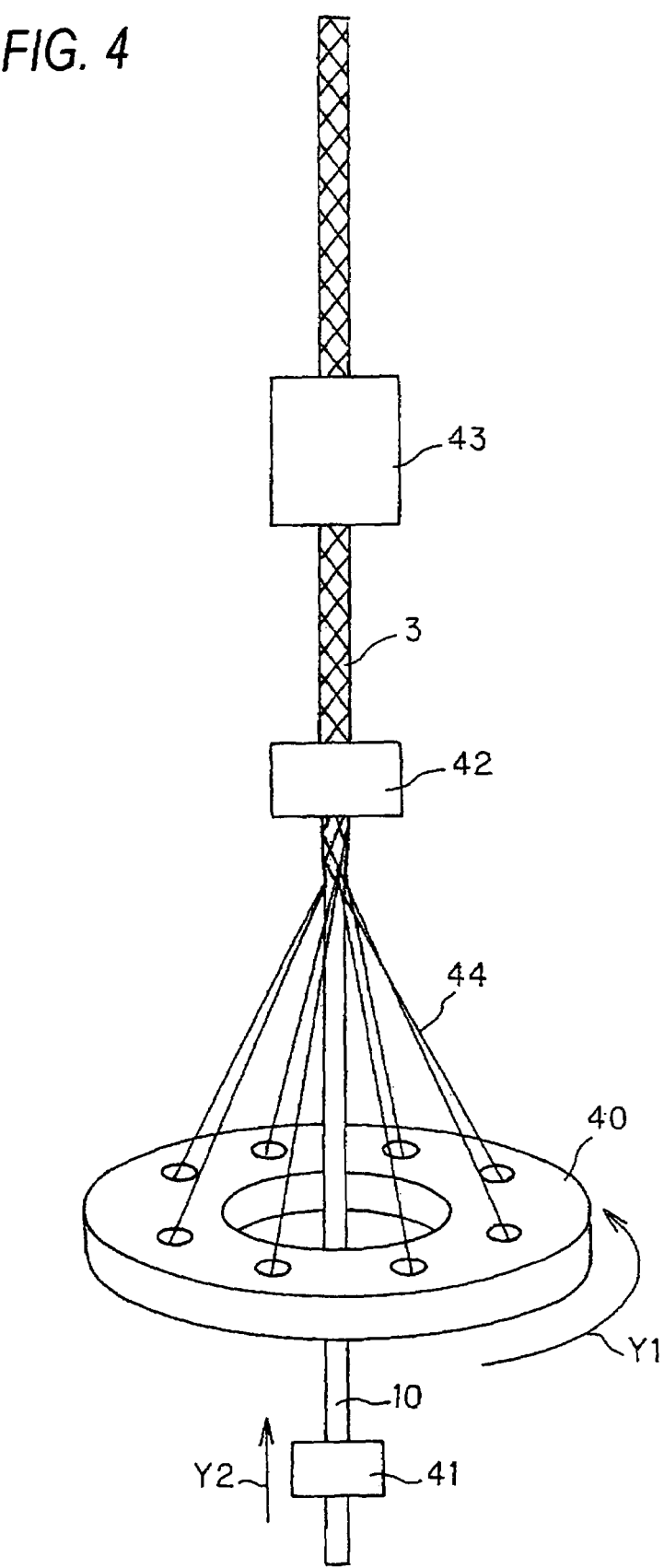
FIG. 4 is a view illustrating a fabricating method of an external conductor in the foamed coaxial cable with high precision according to the foregoing embodiment.

Now, the braiding of a braid body external conductor) 3 and a method for forming the braid body to be ±1 in external diameter precision will be briefly described with reference to FIG. 4.

A tape winding body insulation wire core 10 molded to be in a predetermined external diameter and predetermined external diameter precision by winding a tape body on the outer periphery of a conductor 1, is supplied to a braiding device 40. Then, the wire core is inserted into first and second guides dies 41 and 42 of a braiding device 40 and a molding die 43.

The first guide die 41 guides the insulation wire core 10 and molds the insulation wire core 10 before braided in a predetermined external diameter and predetermined external diameter precision. In the insulation wire core 10 having passed through the first guide die 41, by the rotation of the braiding device 40 having a plurality of braiding elemental wires 44 and alternately rotating in an opposite direction, the braiding elemental wires 44 are entered into braiding, and are braided immediately before the second guide die 42. The second guide die 42 guides the braid body 3, and carries out molding on the outer periphery of the braid body 3.

The braid body 3 having passed through the second guide die (braiding die) 42 is inserted into a molding die 43 having an internal diameter of 1.50 and an internal diameter length of 3.00 mm, and the braid body 3 is molded by the molding die 43. By this molding, the braid body 3 is pulled in its lengthwise direction and squeezed. Thus, the cavities of the braid body 3 itself are eliminated, and the braid body 3 comes into indicate contact with the insulator 2 more significantly. Then, the cavities between the braid body 3 and the insulator 2 are eliminated, and the internal diameter of the braid body 3 becomes closer to a value of the external diameter of the insulator 2. The non-uniformity of the thickness of the braid body 3, the irregularities of external diameter, and a dispersion in external diameter or the like are decreased, the shape of the braid body is close to a completely circular, cylindrical shape. The characteristic impedance value is made constant, a change of which is reduced.

Now, another embodiment of the present invention will be described with reference to FIGS. 5A and 5B to FIG. 10.

Figure 5A:
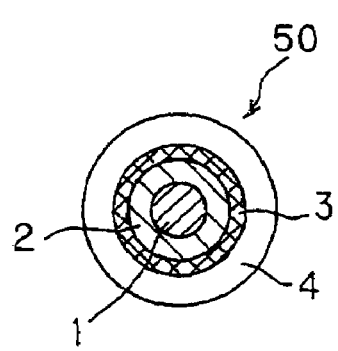
FIGS. 5A and 5B are views each illustrating a construction of a foamed coaxial cable with high precision according to another embodiment.

First, as shown in FIG. 5A, a coaxial cable 50 according to another embodiment comprises: an internal conductor 1; an insulator 2 constructed by winding a porous tape body on the outer periphery of this conductor 1; an external conductor 3 made of a braid body provided on the outer periphery of the insulator 2; and an outer sheath 4 provided on the outer periphery of the external conductor 3. Further, a coaxial cable 55 shown in FIG. 5B has an external holding layer 56 formed on the outer periphery of the insulator 2.

Figure 6:
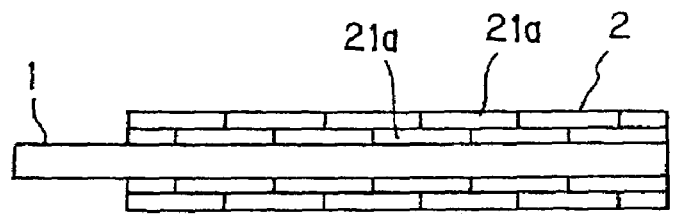
FIG. 6 is a sectional view showing a wire core obtained by winding two porous tape bodies so as not to be layered in the foamed coaxial cable with high precision according to another embodiment.
Figure 7:
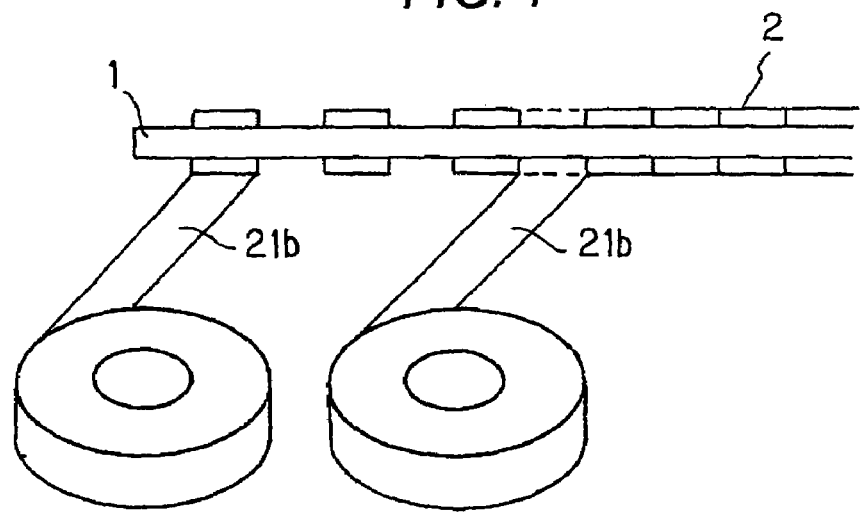
FIG. 7 is a view showing how two porous tape bodies are wound each other with a predetermined interval in the foamed coaxial cable with high precision according to another embodiment.

To the insulator 2, there is applied: a sintered porous PTFE tape body of 60% or more in porosity, ±5% in precision, ±3 μm in thickness, and 0.6% to 0.8% in distortion of compression elasticity, alternatively, a polyethylene porous tape body or the like of 5,000,000 or more in average molecular weight by weight. As shown in FIG. 6, a tape body 21a of 2.5 mm ±3 μm in width and 0.180 mm in thickness is constructed as two turns at a winding angle of 80° around the internal conductor 1 without an overlay of the tape body 21a. Alternatively, as shown in FIG. 7, two tape bodies 21b are held on the outer periphery of the internal conductor 1, and are wound with a widthwise interval of the tape body 21b without any overlay, thereby forming the insulator 2. In this case, no overlay of the tape body 21a is provided, and thus, the cavities at the side of the conductor 1 and 16 external irregularities of the insulator 2 are eliminated. The insulator 2 can be formed so that a change in external diameter is ±1.5% of the center value of the external diameter of the insulator 2.

In addition, on the outer periphery of the insulator 2 formed to be ±1% in external diameter change, there may be provided an external holding layer 56 wound by a plastic tape body at a winding angle of 80° without an overlay. This external diameter holding layer 56 is provided to inhibit restoration of the molded external diameter after the external diameter of the insulator 2 has been molded to be ±1% with an elapse of time. A polyethylene telephthalate tape or the like of 0.025 mm in thickness and 7.5 min in width can be applied.

The external conductor 3 is formed on the outer periphery of the insulator 2 formed to be ±2% in external diameter. The external conductor 3 is composed of a braid body. The specification for applying the braid body is identical to the above described contents. A difference lies in braiding procedures. As shown in FIG. 8B, in a conventional braiding, two of all the shots are set upside (in this case, "two-over" is defined), and then, other two shots are set downside (in this case, "two-under" is defined) whereby braiding is provided.

Figure 8A:
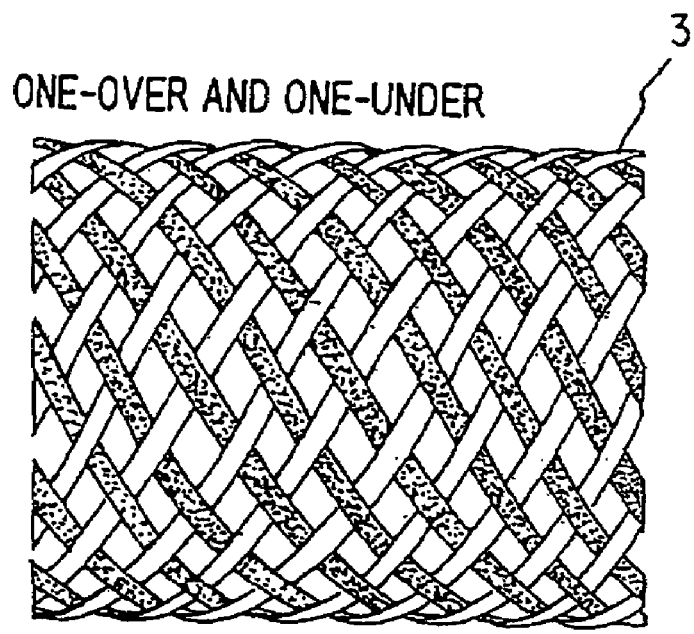
FIGS. 8A and 8B are views each showing a structure of a braid body in the foamed coaxial cable with high precision according to another embodiment.
Figure 8B:
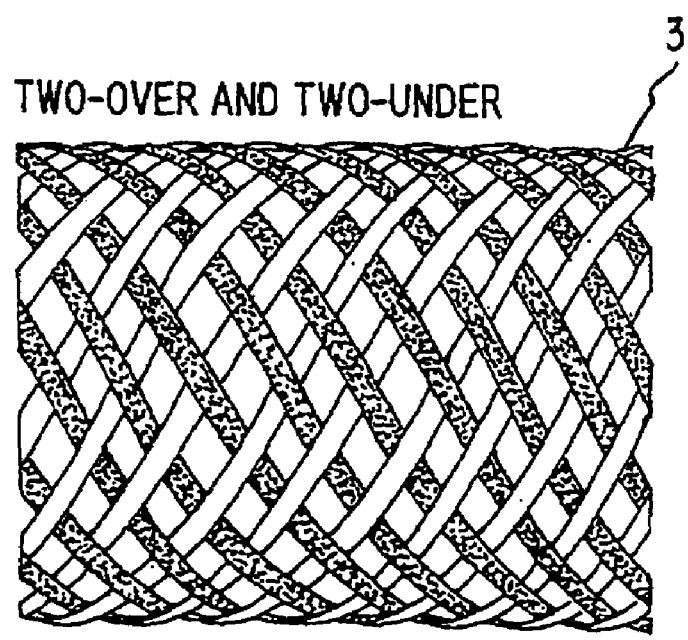

In the present embodiment, although this braiding procedure may be applied, if the braiding in each shot shown in FIG. 8A is "one-over" and "one-under" for each shot, each shot is tightened. Then, the force of making intimate contact with the insulator 2 increases, and the holding force of the insulator 2 increases. Further, the braid itself is easily formed in a cylindrical shape by the tightening of each shot.

Figure 9:
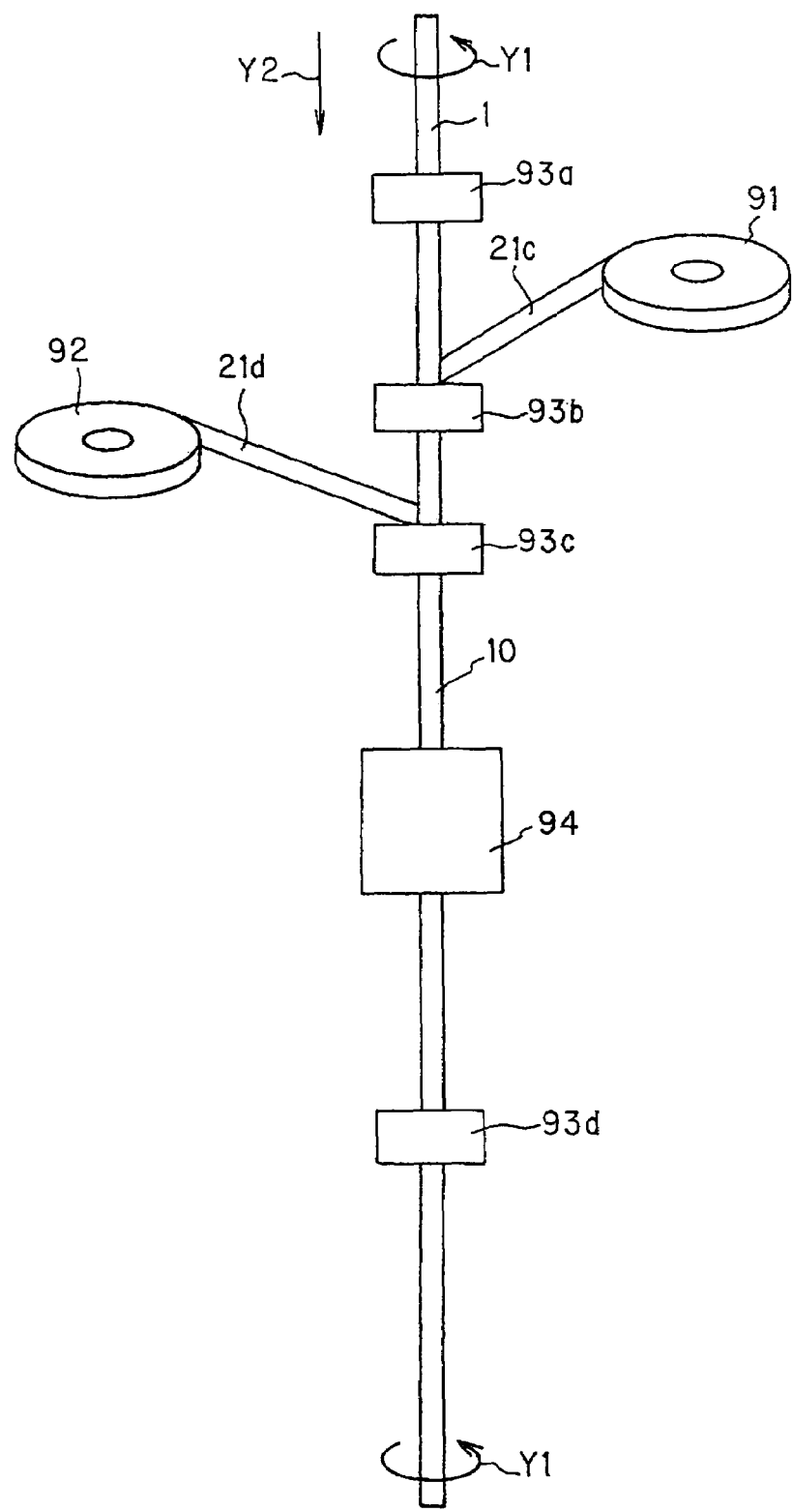
FIG. 9 is a view showing how two porous tape bodies are wound so as not to be layered in the foamed coaxial cable with high precision according to another embodiment.

With reference to FIG. 9, a description will be given with respect to a method for configuring an insulator 2 in which the insulator 2 is wound at a tape width which is three times of the external diameter of the insulator 2, at ±1% in tape body width precision, and at a winding angle of 80° without an overlay on the outer periphery of an internal conductor 1 (corresponding to claim 4).

A twisted conductor (internal conductor) 1 is supplied from a supply portion (not shown) and is inserted into first, second, third, and fourth guide dies 93a, 93b, 93c, and 93d of a tape winding device and a molding die 94. This supplied conductor 1 is rotated in the direction by the arrow Y1 in predetermined frequency of rotation by rotational driving of a rotation driving portion (not shown). Then, the conductor 1 is retracted in the direction by the arrow Y2 at a predetermined velocity by a retracting portion (not shown).

In the conductor 1 having passed through the first guide die 93a, in front of the second guide die 93b, a porous tape body 21c supplied from a tape body supply portion 91 with a predetermined angle is wound at its outer periphery without any overlay by rotation in the direction by the arrow Y1 of the conductor 1 and advancement in the direction by the arrow Y2.

The conductor 1 having the tape 21c wound around it passes through the second guide die 93b. In front of the third guide 93c, the tape body 21d is supplied from a tape body supply portion 92 in a direction opposite to the tape 21c, and is wound on the outer periphery of the conductor. By this tape winding, the tape body 21 is double-wound around the conductor 1 without any overlay. The tape winding body having passed through the third guide die 93c by winding the tape body 21d is inserted into the molding die 94 disposed between the third and fourth guide dies 93c and 93d. Then, the insulator 2 is molded to be ±2% in external diameter change by the insulator passing through a die of 1.12 m in internal diameter and 3.00 mm in die length.

By winding and molding the above tape body 21, the external diameter of the insulator 2 is formed in a completely circular shape, the intimacy with the conductor 1 is improved, and the thickness non-uniformity, the irregularities in external diameter, and a dispersion in external diameter or the like are decreased. After the tape winding body 21 has been molded by the molding die 94, in order to maintain the molding precision, an external diameter holding layer may be provided by winding the tape body 21 with high mechanical strength even if the thickness is small in the fourth guide die 93d.

Figure 10:
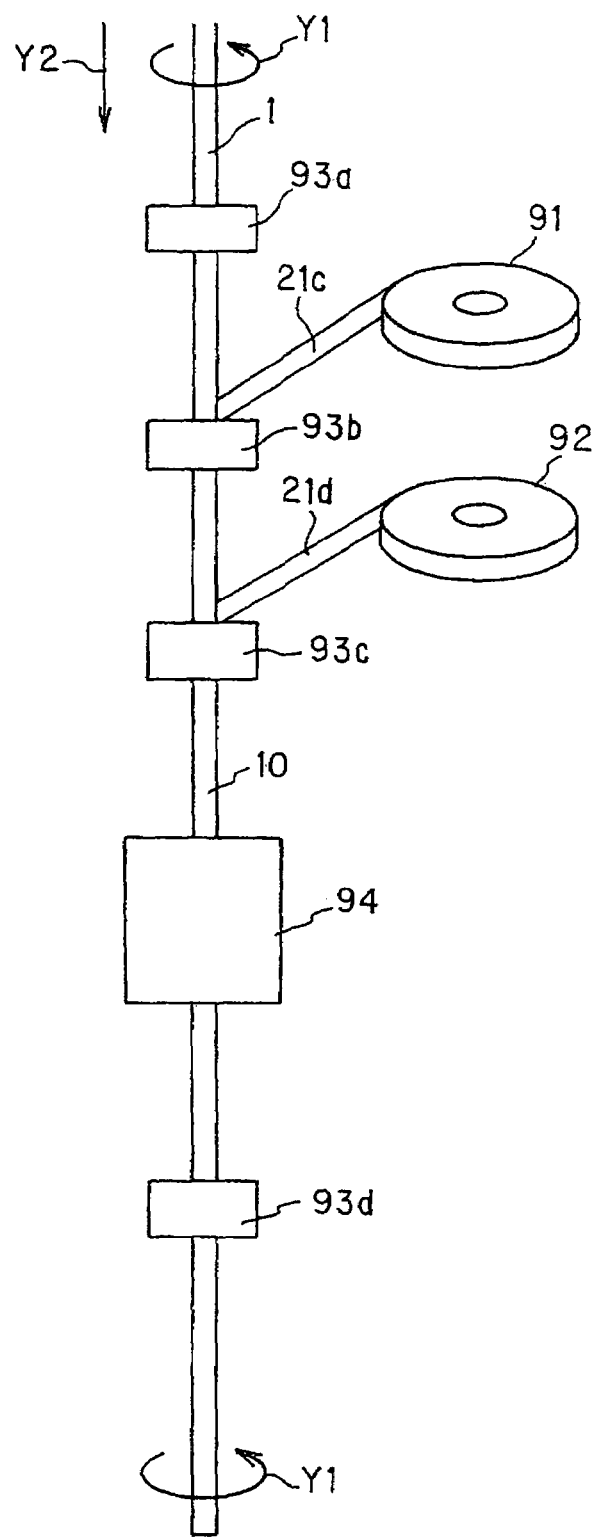
FIG. 10 is a view showing how two porous tape bodies are wound each other with a predetermined interval in the foamed coaxial cable with high precision according to another embodiment.

With reference to FIG. 10, a description will be given with respect to a method for configuring an insulator 2 (corresponding to claim 5) in which the insulator 2 has at least two or more porous tape bodies 21, and is constructed by being wound on the outer periphery of an internal conductor 1 with a tape widthwise interval without any overlay in the same direction.

In front of a second guide die 93b, a porous tape body 21c supplied from a first tape supply portion 91 is wound on the outer periphery of the conductor 1 with a tape body widthwise interval. Next, in front of the guide die 93c, a tape body 21d supplied from a second tape supply portion 93c is wound at a site at which the previously wound tape body is not wound. In this manner, the two tape bodies 21c and 21d are wound without any overlay, thereby making it possible to reduce the irregularities and external diameter dispersion or the like generated by tape winding on the outer periphery of the conductor 1. In addition, a dispersion in insulator specific dielectric constant can be reduced. A tape winding body 21 having passed through a guide die 93c, the tape winding body being wound without any overlay is inserted into a guide die 94, whereby the tape winding body 21 is molded to be ±1% in external diameter change. An external diameter holding layer may be molded by winding another tape body on the outer periphery of the tape winding body 21.

Now, a structure of each coaxial cable and its characteristics are shown below in table 1 and table 2.

applied, were indicated by Cu when soft copper wires themselves were applied, and were indicated by Ag—Sn when tin ally plated soft copper wires were applied. The insulators and braid bodies made of Ag—Sn according to the present invention were indicated by SML1 when they were molded after being inserted into a molding die, and were indicated by SML2 when they were not molded.

The contents of tests carried out in order to compare the characteristics of the above described coaxial cables each are described in the following items <1> to <3>.

<1> Bending test: Characteristic impedance value (A) of a cable cut at 500 mm was measured, the cable at the center of about 200 mm was wound around a mandrel of 5.0 mm in external diameter at a tensile stress of 200 g, and in this state, characteristic impedance value (B) was measured. A change in characteristic impedance values were obtained by (A)–(B). The result is shown in Table 1. As a result, the external diameters of the insulator and braid body were molded by using a tin alloy with a small dynamic frictional (TABLE 1)

| | | Shield material | | |
|---|---|---|---|---|
| Structure | External diameter of braided elemental wire Plating component of 0.08 mm Plating | Ag Electrial plating | Cu (no plating) | Double-layered plating of Ag (lower layer) - Sn 0.75 Cu (upper layer) Lower layer: Electrical plating Upper layer: Melting plating |
| Internal conductor | Material | Silver plated soft cooper wire | Silver plated soft cooper wire | Silver plated soft cooper wire |
| | AWG size | 26 | 26 | 26 |
| | Construction | 7/0.16 | 7/0.16 | 7/0.16 |
| | External diameter | 0.48 | 0.48 | 0.48 |
| Porous tape body (dielectric) | Material | EPTFE tape winding | EPTFE tape winding | EPTFE tape winding |
| | External diameter | 1.15 | 1.15 | 1.15 |
| | Color | White | White | White |
| External conductor (shield) | Material | Silver plated soft cooper wire | Soft cooper wire | Ag, Sn 0.75 Cu plated soft cooper wire |
| | Construction | 0.08 mm × 5 special × 16 shots | 0.08 mm × 5 special × 16 shots | 0.08 mm × 5 special × 16 shots |
| | Pitch | 13 | 13 | 13 |
| | External diameter | 1.5 | 1.5 | 1.5 |
| Outer sheath (sheath) | Material | FEP | FEP | FEP |
| | Thickness | 0.115 | 0.115 | 0.115 |
| | External diameter | 1.73 (max 1.8) | 1.73 (max 1.8) | 1.73 (max. 1.8) |
| | Color | Blue | Blue | Blue |
| Test result | $Z_0$ change due to bending | −7.0 Ω | −5.0 Ω | −3.5 Ω |
| | Flexibility test (compression test) | −430 g | −350 g | −280 g |

(TABLE 2)

| Sample | | SML 1 | SML 2 |
|---|---|---|---|
| $Z_0$ (Ω) | Average value | 50.93 | 52.68 |
| | Maximum value | 51.6 | 54.2 |
| | Minimum value | 50.3 | 51.0 |
| | Range | 1.3 | 3.2 |
| | Standard deviation | 0.229 | 0.465 |

In table 1 and table 2, the internal conductor was twisted at seven sites with silver plated soft copper wires of 0.16 mm. A PTFE tape body of 70% in porosity was applied as an insulator porous tape body. The external conductors were indicated by Ag when silver plated soft copper wires were coefficient for a braid body elemental wire. Thus, a change in characteristic impedance values were reduced, the cable flexibility was improved, and a change in characteristic impedance values due to bending was reduced.

<2> Flexibility test: A sign wire of 72 mm was laid at the substantial center of a cable of 150 mm in length, and there was obtained a value of force when two test pieces left for two hours at a temperature of 23±2° C. and at a relative humidity of 65% or less were compressed up to 40 mm at both ends thereof. The result is shown in Table 1. As a result, a braid body was provided by using a tin alloy plated soft copper wire for a braid body elemental wire. Thus, elemental wires of the braid body each are easily moved, and the flexibility was improved.

<3> Characteristic impedance measured value: Table 2 shows measured values of the previously described SML1 and SML2 by applying a TDR measuring technique. As a result, the characteristic impedance of SML1 was stable with less dispersion. In SML2, the dispersion in characteristic impedance was large, and a tolerance of ±1 Ω could not be met.

As has been described above, according to the present invention, a foamed coaxial cable having an internal conductor, a foamed insulator, an external conductor, and an outer sheath formed in order from the inside to the outside is provided such that the precision of external diameter size of the internal conductor is 4/1000 mm or less; the precision of external diameter size of the foamed insulator is ±0.02 mm, the precision of external diameter size of the external conductor is ±2%, the shape of which is formed in a completely circular shape; the precision of characteristic impedance value between the internal and external conductors having an foamed insulator interposed therebetween is ±1 Ω. Thus, the precision of external diameter size can be improved by reducing external diameter irregularities and external diameter distortion of the internal conductor, insulator, and external conductor or the like configuring the foamed coaxial cable with high precision, each member can be formed in a completely circular shape, and a change in characteristic impedance value can be reduced. Therefore, the cable flexibility can be provided, and the characteristic impedance value can be maintained within the range of ±1 Ω. In addition, the precision of the characteristic impedance value can be maintained even if a variety of mechanical stresses are applied to the cable.

As has been described above, the foamed coaxial cable according to the present invention has flexibility, and is affected by a mechanical stress such as bending, twisting, and vibration or the like applied to the cable. Thus, the transmission characteristics are stabilized, and a change in transmission characteristics can be reduced even if a mechanical stress is applied. In addition, a change in characteristic impedance value can be reduced so as to enhance the precision thereof, and thus, significantly advantageous effect is achieved for industrialization.

Figure 11:
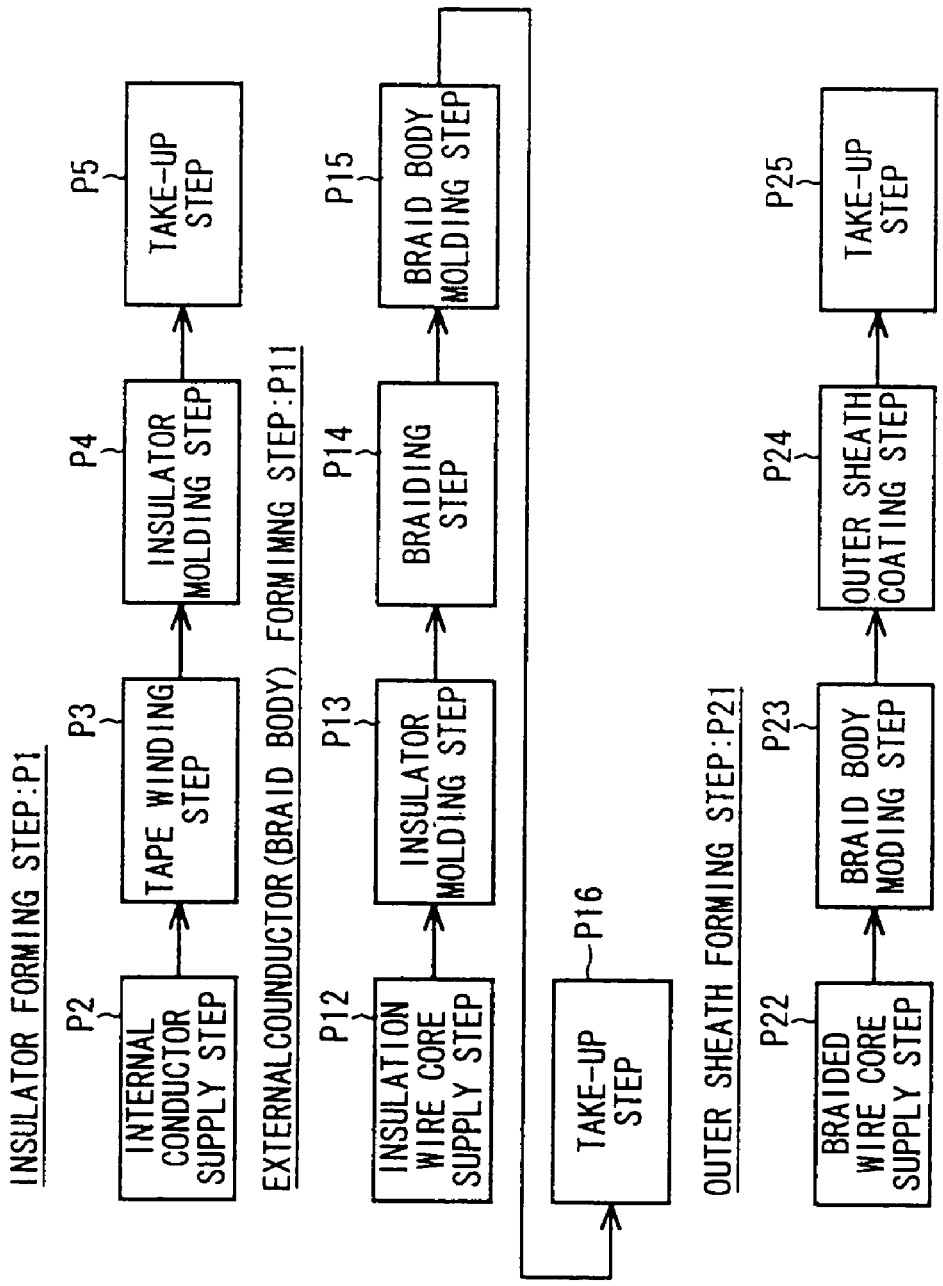
FIG. 11 is a flow chart illustrating a fabricating method of the foamed coaxial cable with high precision according to one embodiment of the present invention.

FIG. 11 is a flow chart illustrating a method for fabricating a foamed coaxial cable with high precision according to one embodiment of the present invention.

A construction of the foamed coaxial cable with high precision formed in accordance with the fabrication step of FIG. 11 is shown in FIG. 1. This foamed coaxial cable with high precision is constructed by sheathing a foamed insulator 2, an external conductor 3 made of a braid body, and an outer sheath 4 in order. However, the external conductor 3 is also referred to as a braid 3 in the following description.

The step of fabricating the foamed coaxial cable with high precision shown in FIG. 11 comprises three steps, i.e., an insulator forming step P1; an external conductor (braid body) forming step P11; and an outer sheath forming step P21. The insulator forming step P1 comprises: an internal conductor supplying step P2; a tape winding step P3; an insulator molding step P4; and a take-up step P5. The external conductor (braid body) forming step P11 comprises: a insulation wire core supplying step P12; an insulator molding step P13; a braiding step P14; a braid body molding step P15; and a take-up step P16. The outer sheath forming step comprises; a braided wire core supplying step P22; a braid body molding step P23; an outer sheath sheathing step P24; and a take-up step P25.

The present embodiment is characterized by the insulator forming step P1 and the external conductor (braid body) forming step P11.

In addition, the insulator forming step P1 and the insulator folding step P4 are identical to each other in contents, and the external conductor (braid body) forming step P11 and the insulator molding step P13 are also identical to each other in contents. In addition, the braid body molding step P15 of the external conductor (braid body) forming step P11 is identical to the braid body molding step P23 of the outer sheath forming step P23 in contents. Therefore, either one of the insulator molding steps P4 and P13 and either one the braid body molding steps P15 and P23 may be carried out individually, alternatively, may be carried out in duplicate in both of these steps. If they are carried out in duplicate both of these steps, the irregularities of the external diameters of the insulator and braid body, the precision of external diameter change, and the precision of the degree of complete circle are improved, and the molding work is stabilized.

Now, the insulator forming step P1 will be described again with reference to FIG. 3.

Figure 3:
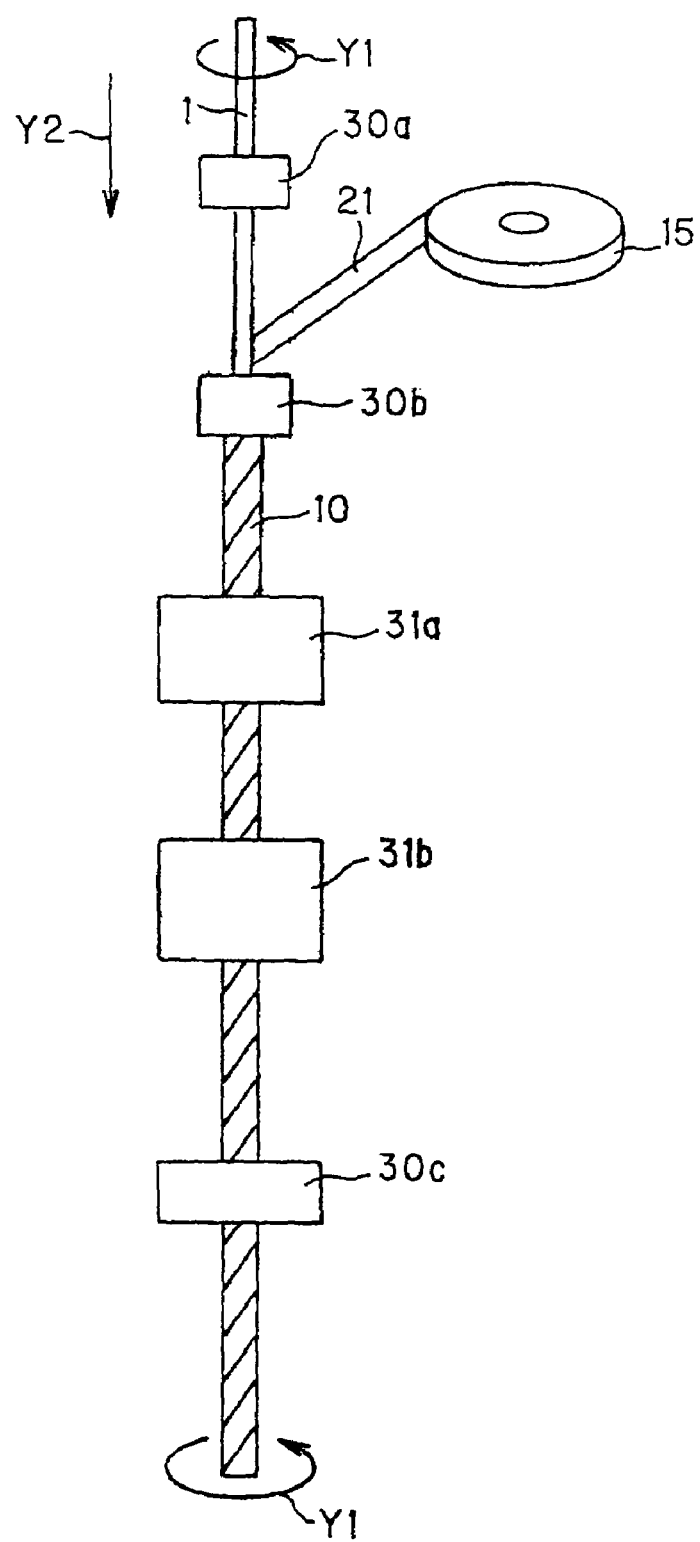
FIG. 3 is a view illustrating a method for winding the porous tape body in the foamed coaxial cable with high precision according to the foregoing embodiment.

First, in the internal conductor supplying step P2, as shown in FIG. 3, a twisted conductor (internal conductor) 1 is supplied from a supply portion (not shown) to first, second, and third guide dies 30a, 30b, and 30c of a tape winding device and molding dies 31a and 31b.

The supplied conductor 1, in the tape winding step P3, is rotated in predetermined frequency of rotation in the direction by the arrow Y1. This rotating conductor 1 is transferred at a predetermined velocity in the direction by the arrow Y2, whereby the conductor is passed through the first guide die 30a. Then, a porous tape body 21 of 60% or more in porosity supplied from a tape body supply portion 15 is wound in front of the second die 30b. In this case, the porous tape body 21 is wound on the outer periphery of the conductor 1 at ½ overlay by the rotation in the direction by the arrow Y1, of the conductor 1 itself, in which an angle of 80 and a tape tensile stress of 300 g are set to the conductor 1.

The wound porous tape body 21 passes through the second die 30b in the insulator molding step P4. The formed tape winding body 10 is inserted into the first and second molding dies 31a and 31b disposed between the second and third guide dies 30b and 30c. During this insertion, a foamed insulator 2 is formed by the squeezing force caused by the internal diameter of each of the molding dies 31a and 31b. However, the first molding die 31 is 1.13 mm in internal diameter and 3.0 mm in die length. The second molding die 31b is 1.12 mm in internal diameter and 3.0 mm in die length. The passing velocity of the tape winding body 10 is 10 m/min.

The external diameter of the thus formed, foamed insulator 2 is formed in a completely circular, cylindrical shape, and the intimacy with the conductor 1 is improved. In addition, the irregularities in external diameter and a dispersion in external diameter or the like are decreased. The tape winding body 10 can be molded more smoothly by the porous tape body 21 molded by the molding dies 31a and 31b while the molding dies 31a and 31b or the like are rotated in predetermined frequency of rotation. Further, when tape winding and tape body sintering are carried out at the same time, the molding dies 31a and 31b may be heated at a sintering temperature. In addition, the foamed insulator 2 is wound in the take-up step P5.

Now, the external conductor (braid body) forming step P11 will be described again with reference to FIG. 4.

First, in the insulation wire core supplying step P12, the tape winding body insulation wire core 10, which has been molded in a predetermined external diameter and in predetermined external diameter precision by winding the porous tape body 21 on the outer periphery of the conductor 1 in the above insulator forming step P1, is supplied to a braiding device 40. The supplied wire core is then inserted into first and second guide dies 41 and 42 of the braiding device 40 and a molding die 43.

In the insulator molding step P13, the insulator wire core 10 before braided is molded in a predetermined external diameter and in predetermined external diameter precision by the first guide die 41 which guides the insulation wire core 10 and serves as a molding die.

The insulation core wire 10 having passed through the first guide die 41, in the braiding step P14, is braided immediately before the second guide die 42, after a plurality of braiding elemental wires 44 have been entered to be braided, by rotation of the braiding device 40 that has plurality of the braiding elemental wires 44 and rotates in an opposite direction to each other.

After this braiding, in the braid body molding step P15, molding on the outer periphery is carried out by insertion into the second guide die 42 that serves as a molding die, and a braid body 3 is formed by insertion into the molding die 43. However, the molding die 43 is 1.5 mm in diameter and 3.0 mm in die length. Only when the braiding device 40 operates, the molding die is rotated by a motor (not shown in frequency of rotation which is substantially 10 times of the braiding velocity, thereby molding the braid body 3.

When the braid body 3 is molded by the molding die 43, the braid body 3 is squeezed by being pulled in its lengthwise direction. Thus, the cavities of the braid body 3 itself are eliminated, and the braid body 3 comes into intimate contact with the insulator 2 more significantly. In addition, the cavities between the braid body 3 and the foamed insulator 2 are eliminated, and the internal diameter of the braid body 3 is made closer to the value of the internal diameter of the foamed insulator 2. Further, the thickness non-uniformity of the braid body 3, the irregularities of external diameter, and a dispersion in external diameter or the like are decreased. Furthermore, the braid body 3 is made close to a completely circular, cylindrical shape, the characteristic impedance value is made constant, and a change of which is reduced. The braid body (braid body wire core) 3 is wound in the take-up step P16.

Figure 12:
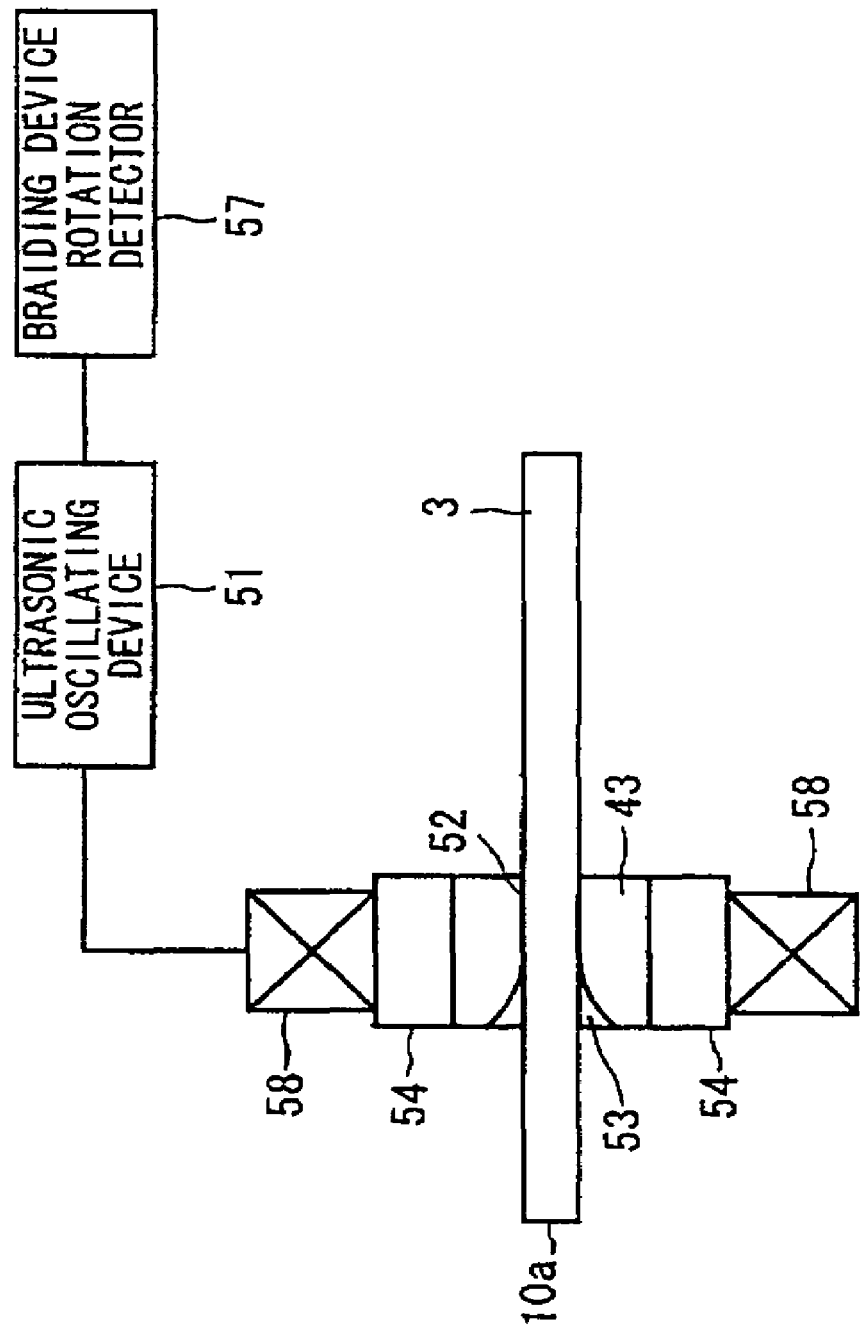
FIG. 12 is a view showing a construction in which ultrasonic vibration is applied to a molding die of an external conductor in the foamed coaxial cable with high precision.

In addition, in the braid body molding step P15, as shown in FIG. 12, ultrasonic vibration is applied to the molding die 43 of the braid body, and predetermined vibration is applied in the external diameter direction of the braid body, whereby molding may be carried out.

Namely, when the braid body 3 is formed by inserting into the molding die 43 a braid body 10a having the insulation wire core 10 braided with braiding elemental wires 44 that are electrically conductive thin wires, ultrasonic vibration of 20 KHz to 45 KHz in frequency, 5 $\mu$m in amplitude, and 200 W to 700 W in output is applied to the molding die by a ultrasonic oscillating device 51, thereby molding an external conductor. By this molding, the braid body 3 is integrated in intimate contact with the foamed insulator 2, and the thickness of the braid body 3 is made uniform. In addition, the irregularities of external diameter are eliminated, and the braid body 3 is molded in a completely circular shape.

The molding die 43 is composed of a stainless steel material, the molding die being 1.52 mm in outlet diameter 52 of 1.52 mm, 1.7 mm in an inlet diameter 53, and 3.0 mm in length at a portion of the outlet diameter 52. At the outer face of the molding die 43, a resonance disk 54 which applies to the die 43 in radial direction is provided. Further, a vibrator 58 for vibrating the resonance disk 54 is provided at the outer face of the resonance disk 54.

The vibrator 58 is constructed so as to be vibrated by a ultrasonic oscillating device 51, and oscillated only when the braiding device 40 operates. The ultrasonic oscillating device 51 which oscillates only when the braiding device 40 is operated by a rotation detector 57 of the braiding device vibrates the molding die 43 by converting electrical vibration into mechanical vibration via a vibrator 58.

The molding die 43 vibrates the braid body 3 in abutment against the die 43 under the above described vibration conditions, and molds it based on the die hole diameter. At a site at which the irregularities of external diameter of the braid 3 and a change in external diameter are excessive, the frictional force between the braid body 3 and the die 43 is decreased or eliminated by vibration, whereby the wire breakage or scratch of the braid body is eliminated. Further, the wire breakage, expansion, and damage or the like of the foamed insulator 2 and internal conductor 1 are eliminated during molding.

Although the braid body molding step P15 has been provided after the braiding step P14 in the foregoing description, the molding step P15 may be provided independently immediately before the outer sheath forming step P21 or may be provided at both of a step after the braiding step P14 and a step immediately before the outer sheath forming step P21.

Figure 13:
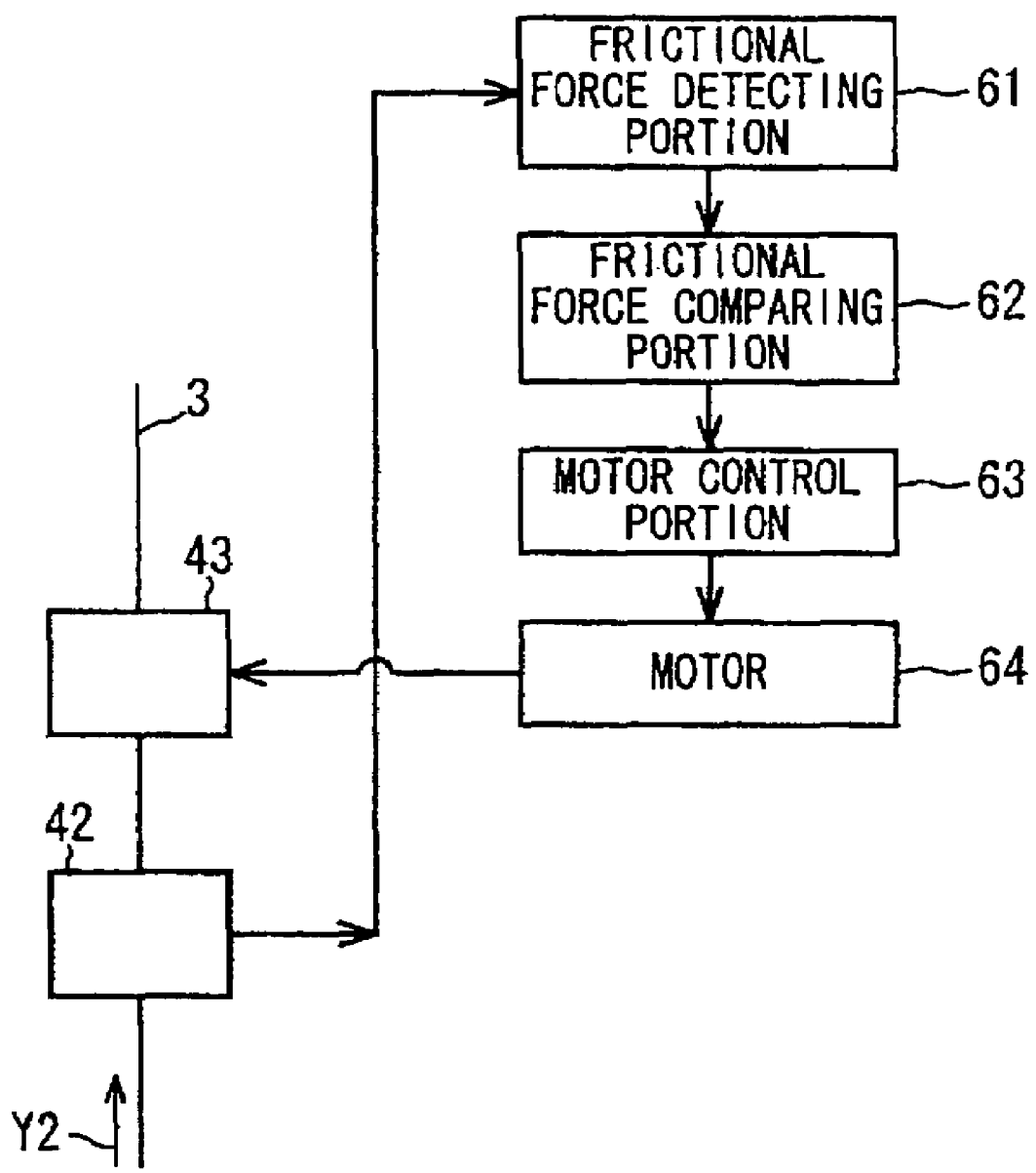
FIG. 13 is a view showing a construction in which the molding die of the external conductor in the foamed coaxial cable with high precision is rotated according to detecting of a frictional force.

In the braid body molding step P15, the molding of the braid body 3 may be carried out in a more stable manner with a control arrangement shown in FIG. 13.

First, a braid body wire core is inserted into a second guide die 42 that serves as a molding die as well. The contact frictional force (contact pressure) between the die 42 and the braid body wire core produced by this insertion is detected by a frictional force detecting portion 61. The detected contact frictional force and a predetermined tensile stress (expansion) of the braid body wire core are compared with each other by a frictional force comparing portion 62. As a result, in case where the contact frictional force is greater, a motor for rotation of the molding die 43 is rotated by a motor control portion 63. When the molding die 43 is thus rotated, the frictional force (pressure) applied to the braid body wire core when the braid wire core is applied by the molding die decreases, whereby stable external conductor molding can be carried out.

In actual working of the invention, the diameter of the second guide die 42 was set to 1.60 mm, and the diameter of the molding die 43 was set to 1.50 mm. In addition, the molding die 43 was rotated in frequency of rotation that is about 10 times of the braiding velocity. The rotation was carried out in case where the contact frictional force between a primary molding die and the braid body wire core was 100 gf/mm$^2$ or more in which deformation of the braid body occurs.

Figure 14:
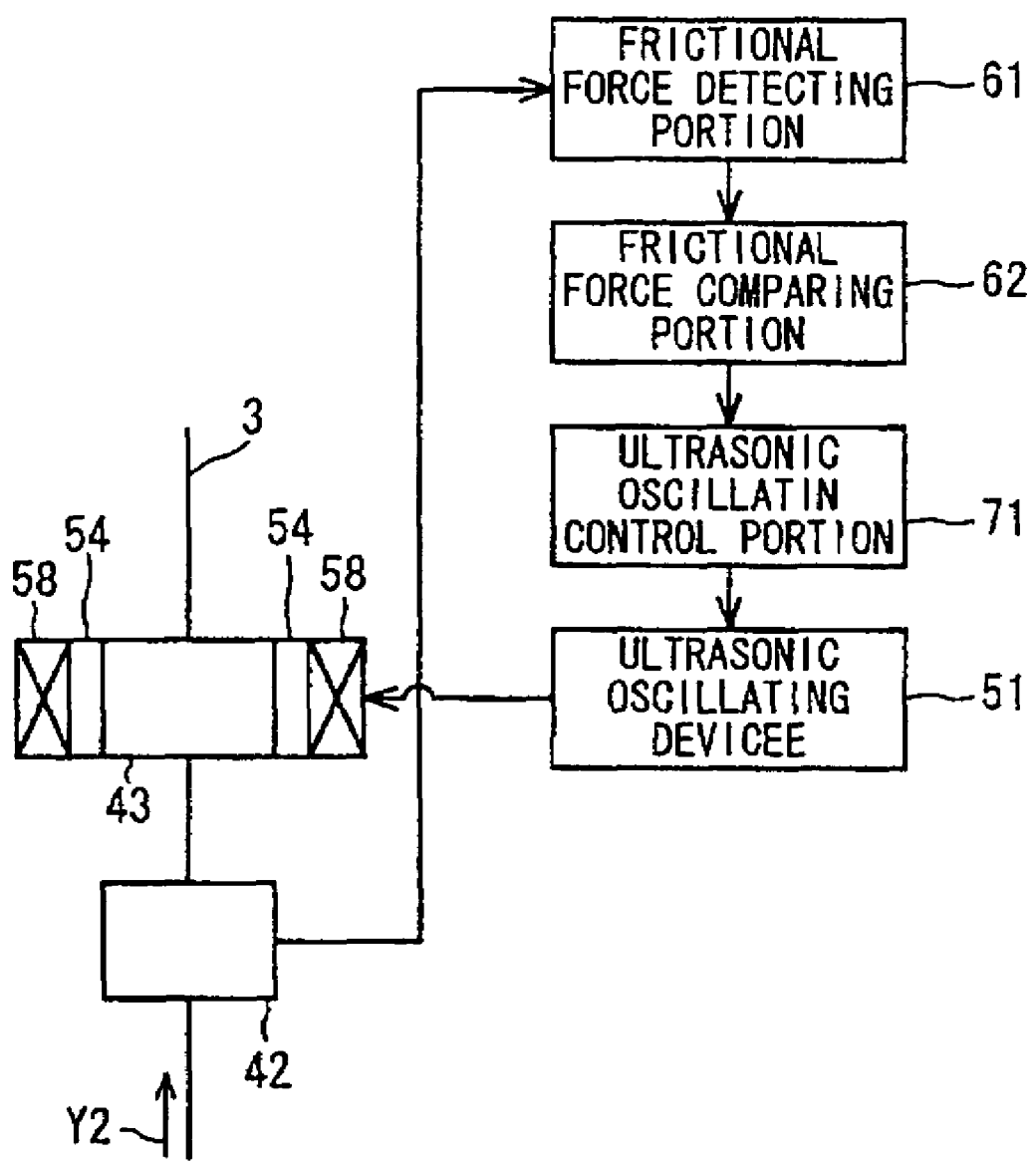
FIG. 14 is a view showing a construction in which ultrasonic vibration is applied to a molding die of an external conductor in the foamed coaxial cable with high precision according to detecting of the frictional force.

Further, in the braid body molding step P15, molding of the braid body 3 may be carried out in a more stable manner with a control arrangement shown in FIG. 14.

As described above with reference to FIG. 13, in case where the contact frictional force is greater as a result of comparison between the contact frictional force and tensile stress by the frictional force comparing portion 62, the ultrasonic oscillating device 51 is oscillated via a ultrasonic oscillation control portion 71. Such oscillation is transmitted to the molding die 43 via a resonance disk 54 and a vibrator 58, and a braid body wire core is molded by vibration of the molding die 43. The contact frictional force associated with the braid body wire core is decreased by ultrasonic vibration of the molding die 43. Then, a frictional force (pressure) applied to the braid body wire core when the braid body wire core is molded by the molding die 43 decreases, and stable external conductor molding can be carried out.

In actual working of the invention, the diameter of the second guide die 42 was set to 1.60 mm, the diameter of the molding die 43 was set to 1.50 mm, and vibration of the molding die 43 was carried out in the same manner as described previously. That is, the molding die 43 was vibrated in case where the contact frictional force between a primary molding die and the braid body wire core was 100 gf/mm$^2$ or more in which deformation of the braid body occurs.

After such insulation forming step P1 and external conductor (braid body) forming step P11 have been carried out, the outer sheath forming step P21 is carried out, whereby, as shown in FIG. 5A, there is formed a foamed coaxial cable 80 with high precision consisting of: an internal conductor 1; an external conductor 3 made of a braid body provided on the outer periphery of the foamed insulator 2; and an outer sheath 4 provided on the outer periphery of the external conductor 3.

Figure 5B:
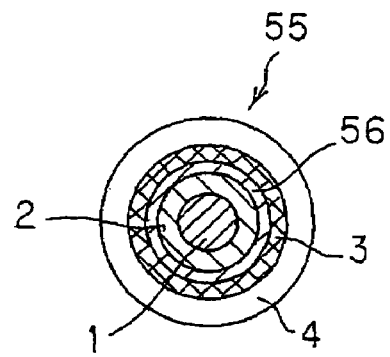

In addition, as in a foamed coaxial cable with high precision 55 shown in FIG. 5B, an outer diameter holding layer 56 may be formed on the outer periphery of the foamed insulator 2. The outer diameter holding layer 56 is wound on the outer periphery of the foamed insulator 2 at a winding angle 80° with aplastic tape body without any overlay. This external diameter holding layer 56 is provided to inhibit restoration of the molded external diameter with an elapse of time after the foamed insulator 2 has been molded to be ±1% in external diameter, for example. To the external holding layer, a polyethylene telephthalate tape or the like of 0.025 mm in thickness and 7.5 mm in width can be applied.

Figure 15:
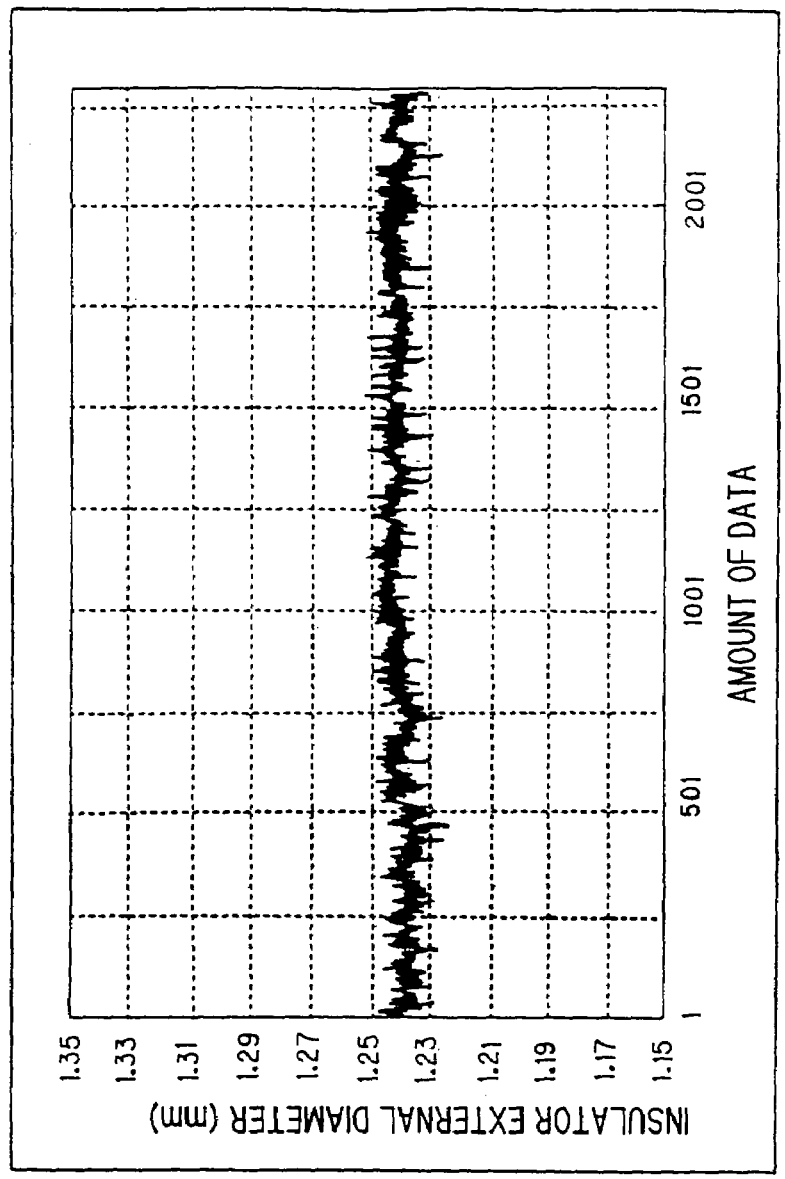
FIG. 15 is a view showing a change in external diameter of a foamed insulator in case where the insulator has been molded by applying an insulator forming step according to the present embodiment.
Figure 16:
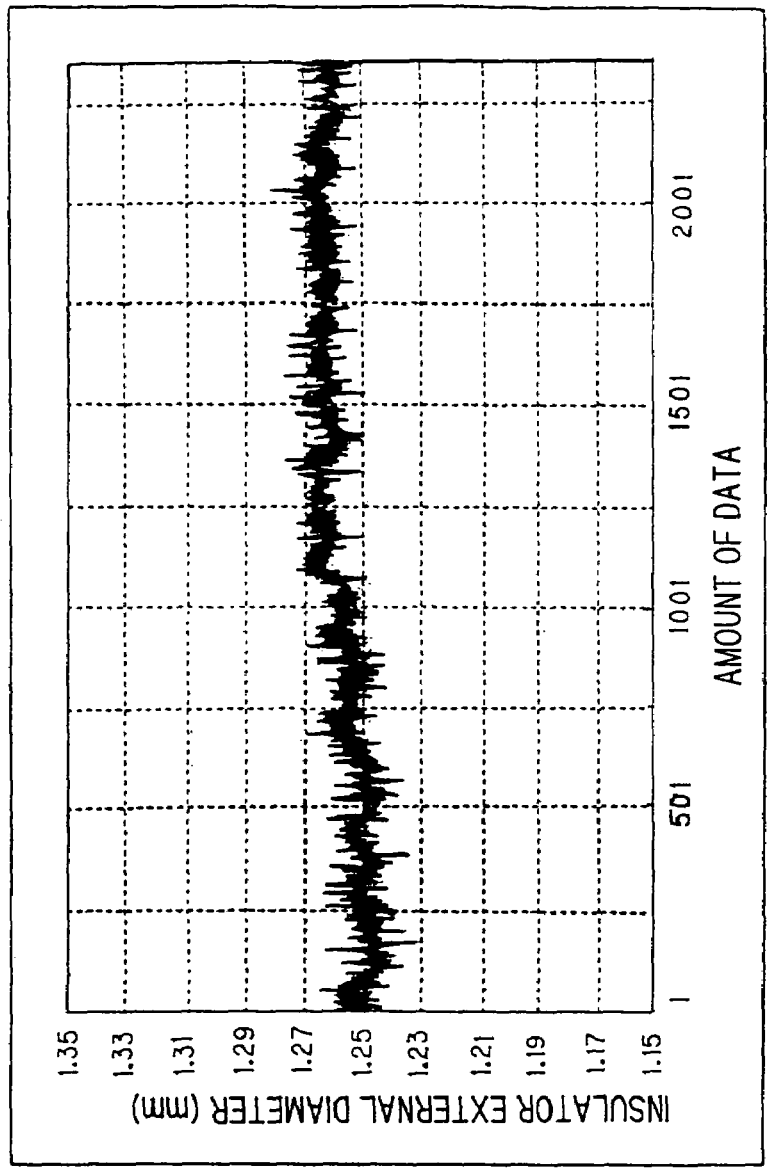
FIG. 16 is a view showing a change in external diameters of the insulator in the case the above insulator forming step is not applied.

FIG. 15 shows a change in insulator external diameter (mm) when a foamed insulator has been molded by applying the above described insulator forming step P1. FIG. 16 shows a change in insulator external diameter (mm) when the above step P1 is not applied. A comparison between these two cases was carried out.

As a result, by molding the foamed insulator by the molding die, it was found that the external diameter of the insulator is made constant, the insulator is formed in a completely circular shape, and a change in external diameter is reduced. The external diameter was measured with an interval of 100 mm in lengthwise direction by using a laser type external diameter measuring instrument (available from Takikawa Engineering Co., Ltd.).

Figure 17:
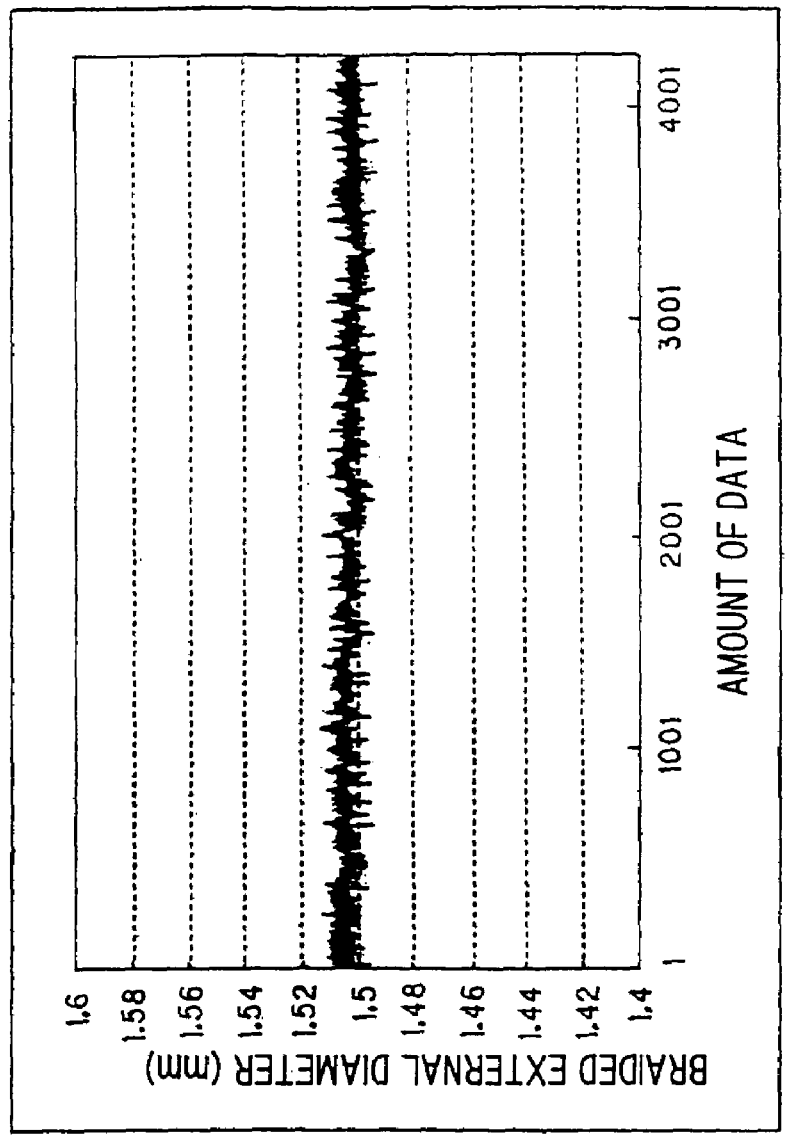
FIG. 17 is a view showing a change in external diameters of an external conductor (braid body) in case where the external conductor (braid body) has been molded by applying an external conductor (braid body) forming step according to the present embodiment.
Figure 18:
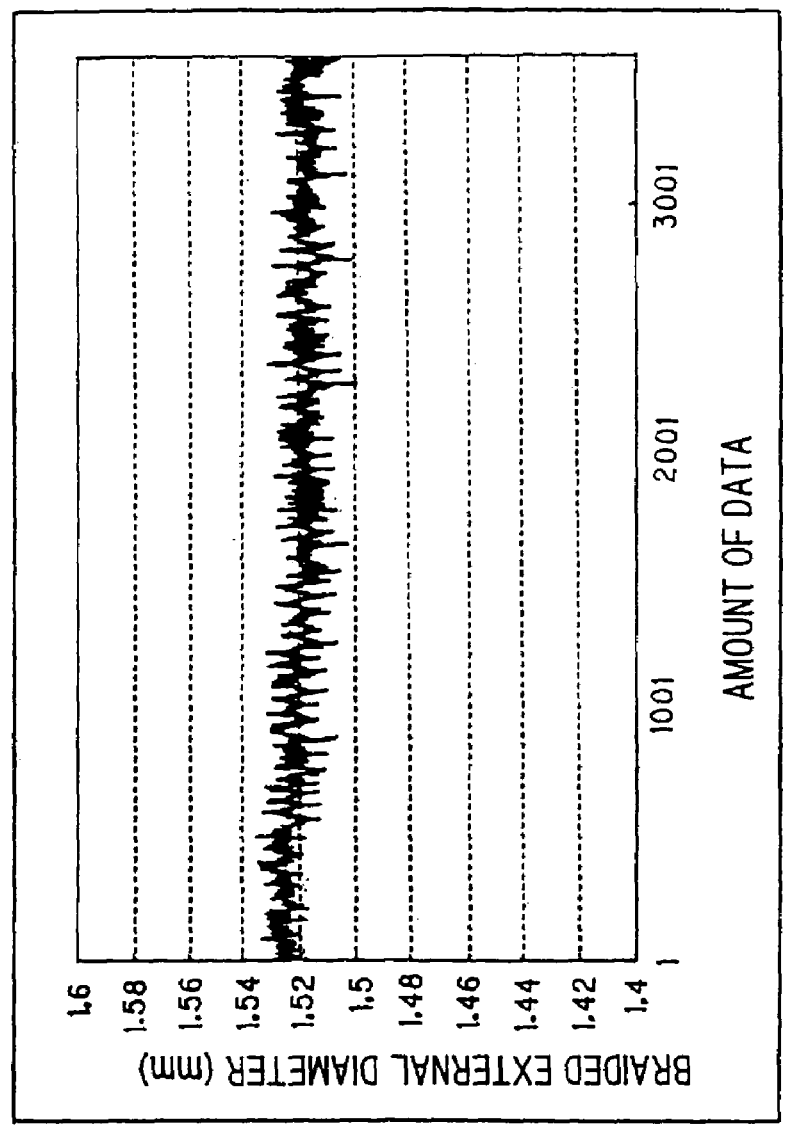
FIG. 18 is a view a change in external diameters of an external conductor (braid body) in case where the above external conductor (braid body) forming step is not applied.

FIG. 17 shows a change in external diameter (mm) of an external conductor (braid body) when an external conductor (braid body) has been molded by applying the external conductor (braid body) forming step P11. FIG. 18 shows a change in external diameter (mm) of an external conductor (braid body) when the above forming step P11 is not carried out. A comparison between these two cases was carried out.

As a result, it was found that the external diameter of the external conductor is made constant, is formed in a completely circular shape, and a change in external diameter is reduced by molding the external conductor by the molding die. Measurement of the external diameter was carried out in the same manner as when the external diameter of the foamed insulator had been measured.

Figure 19:
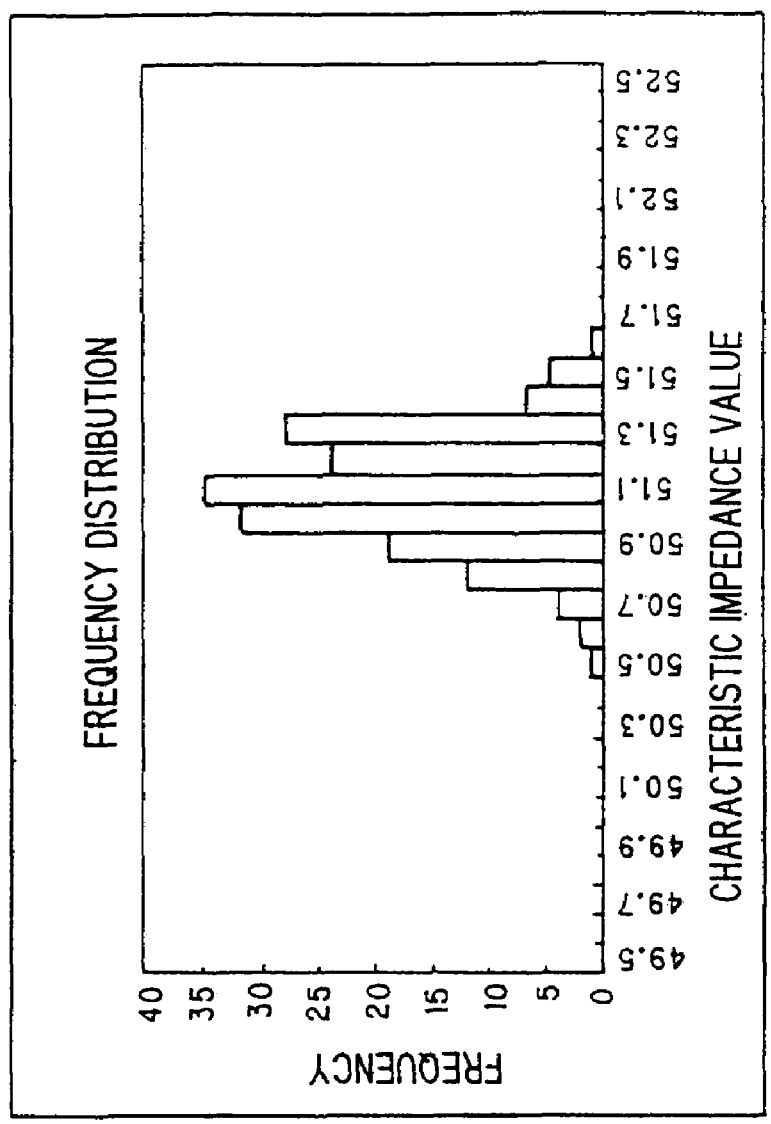
FIG. 19 is a view showing actually measured characteristic impedance values in case where the foamed insulator and external conductor has been molded by applying the insulator forming step and external conductor (braid body) forming step.
Figure 20:
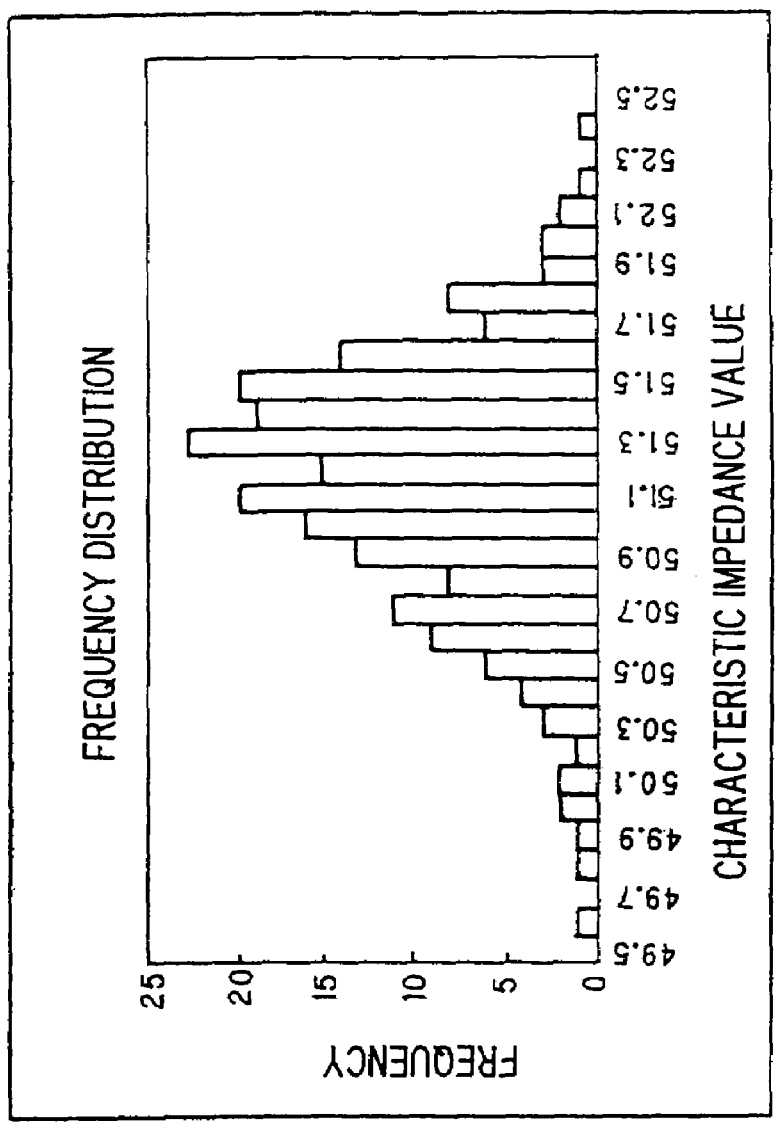
FIG. 20 is a view showing actually measured characteristic impedance values in case where the insulator forming step and external conductor (braid body) forming step are not applied.

FIG. 19 shows an actually measured characteristic impedance value (Ω) when a foamed insulator and an external conductor have been molded by applying the insulator body forming step P1 and the external conductor (braid body) forming step P11. FIG. 20 shows an actually measured characteristic impedance value (Ω) when the above steps are not carried out. A comparison between these cases was carried out.

As a result, when the foamed insulator and external conductor were molded, all of the characteristic impedance values were indicated with a margin of 51.0±1 Ω. The characteristics impedance values were measured in accordance with a TDR technique.

As has been described above, according to the present invention, there is provided a fabrication method of a foamed coaxial cable with high precision that has an internal conductor, a foamed insulator formed on the outer periphery of this internal conductor, and an external conductor formed on the outer periphery of the foamed insulator, said fabrication method comprising; a take-up step of winding a porous tape body of 60% or more in porosity around the internal conductor supplied from a supply portion, thereby forming the foamed insulator; an insulator molding step of inserting the foamed insulator formed in the take-up step into a molding die having a predetermined internal diameter, thereby molding the insulator in a predetermined external diameter and in a completely circular shape; a braiding step of braiding a plurality of electrically conductive thin wires on the outer periphery of the foamed insulator formed in the insulator molding step, thereby forming the external conductor; and an external conductor molding step of inserting the external conductor formed in the braiding step into the external conductor molding die having a predetermined internal diameter, thereby forming the external conductor in a predetermined external diameter and in a completely circular shape. Therefore, the highly foamed insulator is formed in a completely circular shape without any dispersion, an external conductor composed of a braid body can be stabilized and formed in a completely circular shape without irregularities and dispersion of external diameter, and the foamed coaxial cable with high precision in ±1 Ω in characteristic impedance value can be fabricated.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching herein set forth.

What is claimed is:
1. A foamed coaxial cable with high precision comprising:
an internal conductor having a plurality of electrically conductive wires twisted with each other;
a foamed insulator with a low dielectric constant made of a porous tape body formed on an outer periphery of the internal conductor;
an external conductor made of a number of electrically conductive thin wires braided on an outer periphery of the foamed insulator; and
an outer sheath made of resin having heat resistance formed on an outer periphery of the external conductor, wherein the precision of external diameter of the internal conductor is 4/1000 mm or less; the precision of external diameter size of the foamed insulator is ±0.02 mm, the precision of external diameter size of the external conductor is ±2% of the center value of the external diameter of the external conductor, the external conductor is formed in a completely circular-shape; and the precision of the characteristic impedance value between the internal conductor and the external conductor having the foamed insulator interposed therebetween is ±1 Ω.

2. A foamed coaxial cable with high precision according to claim 1, wherein the internal conductor is formed by twisting silver plated soft copper wires to which silver plating of 2/1000 mm or less in precision of external diameter size and 1 to 3 μm in thickness has been applied.

3. A foamed coaxial cable with high precision by according to claim 1, wherein the foamed insulator is formed by winding the porous tape body on the outer periphery of the internal conductor in ½ overlay turn, a change in thickness of the foamed insulator after wound is ±0.01 mm, and a change in outer diameter is ±0.02 mm.

4. A foamed coaxial cable with high precision according to claim 3, wherein the foamed insulator has an outer diameter holding layer constructed by winding a plastic tape body on the outer periphery thereof.

5. A foamed coaxial cable with high precision according to claim 3, wherein the porous tape body is a sintered PTFE tape body of 0.6% to 0.8% in distortion of compression deformation in case where the porosity thereof is 60% or more, the precision of the porosity is ±5%, a thickness tolerance is ±3 μm, and a compression stress is 0.24 to 0.28 Kg by weight.

6. A foamed coaxial cable with high precision according to claim 3, wherein the porous tape body is a polyethylene tape body with 5,000,000 or more in average molecular weight by weight of which the porosity is 60% or more, the precision of porosity is ±5%, and the thickness tolerance is 3 μm.

7. A foamed coaxial cable with high precision according to claim 1, wherein the foamed insulator is formed by winding the porous tape body on the outer periphery of the internal conductor so that the porous tape body itself does not overlay, the width of the porous tape body to be wound is three times of the external diameter size of the foamed insulator, and the precision of the width thereof is ±1%.

8. A foamed coaxial cable with high precision according to claim 1, wherein the foamed insulator has at least the two or more porous tape bodies, each of which does not overlay on the outer periphery of the internal conductor with a tape widthwise interval in the same direction.

9. A foamed coaxial cable with high precision according to claim 1, wherein the external conductor is made of a braid body of double-layered, plated soft copper wires in which a tin alloy plating of 0.2 to 0.5 μm in thickness is applied to a silver plated soft copper wire of 1 to 3 μm in thickness, thereby obtaining an external diameter tolerance of ±2/1000 mm.

10. A foamed coaxial cable with high precision according to claim 9, wherein the tin alloy plating consists essentially of tin and copper, and the copper percentage content is 0.6% to 2.5%.

11. A foamed coaxial cable with high precision according to claim 1, wherein the external conductor is formed of a braid body of double-layered, plated soft copper wires in which a tin alloy plating of 0.2 to 0.5 μm in thickness is applied to a nickel plated soft copper wire of 1 to 3 μm in thickness, thereby obtaining an external diameter tolerance of ±2/1000 mm.

12. A foamed coaxial cable with high precision according to claim 1, wherein a braid body configuring the external conductor is braided when the number of braiding shots each configuring the braid is one-over and one-under.

13. A foamed coaxial cable with high precision according to claim 1, wherein the outer sheath has the thickness of 0.5 times or more of that of the external conductor, the thickness precision of 3/100 mm or less, and the force of making intimate contact with the external conductor of 20 g/mm$^2$ at 23° C. and is formed by extrusion molding of an FEP resin.

14. A method for fabricating a foamed coaxial cable with high precision having: an internal conductor; a foamed insulator formed on the outer periphery of the internal conductor; and an external conductor formed on an outer periphery of the foamed insulator, said method comprising:

a take-up step of winding a porous tape body of 60% or more in porosity around the internal conductor supplied from a supply portion, thereby forming the foamed insulator;

an insulator molding step of inserting the foamed insulator formed in the take-up step into a molding die having a predetermined internal diameter, thereby molding the insulator in a predetermined external diameter and in a completely circular shape;

a braiding step of braiding a plurality of electrically conductive thin wires on the outer periphery of the foamed insulator formed in the insulator molding step, thereby forming the external conductor; and an external conductor molding step of inserting the external conductor formed in the braiding step into an external conductor die having a predetermined internal diameter, thereby forming the external conductor in a predetermined external diameter and in a completely circular shape.

15. A method for fabricating a foamed coaxial cable according to claim 14, wherein the insulator molding step comprises: a primary molding step of inserting the insulator into a primary molding die having a predetermined internal diameter, thereby molding the insulator; and a secondary molding step of inserting the insulator into a second molding die having a predetermined internal diameter, thereby molding the insulator.

16. A method for fabricating a foamed coaxial cable according to claim 14, further comprising an external diameter holding layer step of forming a very thin external diameter holding layer by winding the layer on the outer periphery of the foamed insulator molded in a predetermined external diameter and in a completely circular shape in accordance with the insulator molding step.

17. A method for fabricating a foamed coaxial cable according to claim 14, wherein the external conductor molding step comprises: a primary molding step of inserting the external conductor into a primary molding die having a predetermined internal diameter, thereby molding the conductor; and a secondary molding step of inserting the external conductor into a secondary molding die having a predetermined internal diameter, thereby molding the conductor.

18. A method for fabricating a foamed coaxial cable according to claim 17, wherein, in the external conductor molding step, in case where a frictional force between the external conductor inserted into the primary molding die and the primary molding die is equal to or larger than a predetermined value, the secondary molding die is rotated in predetermined frequency of rotation.

19. A method for fabricating a foamed coaxial cable according to claim 17, wherein when a frictional force between the external conductor inserted into the primary molding die and the primary molding die is equal to or larger than a predetermined value, ultrasonic vibration is applied to the secondary molding die.

20. A method for fabricating a foamed coaxial cable according to claim 14, wherein the external conductor molding step molds the external conductor by rotating the external conductor molding die in predetermined frequency of rotation.

21. A method for fabricating a foamed coaxial cable according to claim 14, wherein the external conductor molding step applies ultrasonic vibration to the external conductor molding die, and applies a predetermined vibration in an external diameter direction of the external conductor, thereby molding the external conductor.

22. A method for fabricating a foamed coaxial cable according to claim 14, wherein the external conductor molding step is provided after the braiding step, is provided immediately alone before the outer sheath forming step of the outer sheath formed on the outer periphery of the external conductor, or is provided as both of a step after the braiding step and a step immediately before the outer sheath forming step.

* * * * *

UNITED STATES PATENT AND TRADEMARK OFFICE
CERTIFICATE OF CORRECTION

PATENT NO. : 6,963,032 B2
APPLICATION NO. : 10/503914
DATED : November 8, 2005
INVENTOR(S) : Tetsuo Yamaguchi et al.

It is certified that error appears in the above-identified patent and that said Letters Patent is hereby corrected as shown below:

Claim 7.
    on column 25, line 30, delete "to claim 1" and insert --to claim 3--.

Claim 8.
    on column 25, line 37, delete "to claim 1" and insert --to claim 3--.

Claim 18.
    on column 26, line 56, delete "to claim 17" and insert --to claim 14--.

Signed and Sealed this

Sixteenth Day of October, 2007

JON W. DUDAS
*Director of the United States Patent and Trademark Office*